US011052604B2

(12) United States Patent
Manuel

(10) Patent No.: US 11,052,604 B2
(45) Date of Patent: *Jul. 6, 2021

(54) VARIABLE-CONTOUR COMPACTION ROLLER

(71) Applicant: Arevo, Inc., Santa Clara, CA (US)

(72) Inventor: Steven George Manuel, San Mateo, CA (US)

(73) Assignee: Arevo, Inc., Milpitas, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 15/959,214

(22) Filed: Apr. 21, 2018

(65) Prior Publication Data

US 2019/0322045 A1 Oct. 24, 2019

(51) Int. Cl.
| | | |
|---|---|---|
| *B29C 64/218* | (2017.01) | |
| *B29C 64/209* | (2017.01) | |
| *B29C 64/118* | (2017.01) | |
| *B29C 64/245* | (2017.01) | |
| *B29C 64/295* | (2017.01) | |
| *B33Y 10/00* | (2015.01) | |
| *B33Y 30/00* | (2015.01) | |

(52) U.S. Cl.
CPC .......... *B29C 64/218* (2017.08); *B29C 64/118* (2017.08); *B29C 64/209* (2017.08); *B29C 64/245* (2017.08); *B29C 64/295* (2017.08); *B33Y 10/00* (2014.12); *B33Y 30/00* (2014.12)

(58) Field of Classification Search
CPC ..... B29C 70/30; B29C 70/543; B29C 70/382; B29C 70/384; B29C 70/386; B29C 70/388; B29C 64/218; B29C 64/209; B29C 64/118; B29C 64/245; B29C 64/295; B29C 64/194
See application file for complete search history.

(56) References Cited

U.S. PATENT DOCUMENTS

| | | |
|---|---|---|
| 3,775,219 A | 11/1973 | Karlson et al. |
| 3,810,805 A | 5/1974 | Goldsworthy |
| 4,285,752 A | 8/1981 | Higgins |
| 4,557,783 A | 12/1985 | Grone et al. |
| 4,569,716 A | 2/1986 | Pugh |
| 4,714,509 A | 12/1987 | Gruber |

(Continued)

OTHER PUBLICATIONS

Office action, U.S. Appl. No. 15/959,215, dated Dec. 15, 2020.

(Continued)

*Primary Examiner* — Joseph S Del Sole
*Assistant Examiner* — Mohamed K Ahmed Ali
(74) *Attorney, Agent, or Firm* — McGeary Cukor LLC; Kenneth Ottesen; Jason Paul DeMont

(57) ABSTRACT

In a 3D-printing system, a deposition head comprising a band assembly having a body and a band for compacting a filament onto the surface of an object being manufactured. One or more actuators are mounted on the assembly body and are used to shape the band to a desired contour. The band is connected to the one or more actuators, and is capable of being driven along its length by one or more drive wheels. For example, the band can be in the form of a loop, arranged such that the front of the loop is in contact with a front wheel, the back of the loop is in contact a rear wheel, and the bottom of the loop faces toward the surface of the object. The band assembly further comprises a compaction support supporting the band and comprising a roller that permits the band to move along its length.

20 Claims, 16 Drawing Sheets

(56) References Cited

U.S. PATENT DOCUMENTS

| | | | |
|---|---|---|---|
| 4,922,133 | A | 5/1990 | Iwahashi et al. |
| 5,177,340 | A | 1/1993 | Zaffiro |
| 5,288,357 | A | 2/1994 | Yamada et al. |
| 6,390,169 | B1 | 5/2002 | Johnson |
| 6,941,632 | B1 | 9/2005 | Mead et al. |
| 7,820,092 | B2 | 10/2010 | Benson et al. |
| 7,993,124 | B2 | 8/2011 | Nelson et al. |
| 10,016,931 | B2 | 7/2018 | Kurtz et al. |
| 10,751,954 | B2 | 8/2020 | Wadsworth |
| 2004/0089425 | A1 | 5/2004 | Glovatsky et al. |
| 2015/0165698 | A1 | 6/2015 | Dietachmayr |

OTHER PUBLICATIONS

Office action, U.S. Appl. No. 15/959,213, dated Jan. 21, 2021.
U.S. Appl. No. 15/959,213, Notice of Allowance and Fee(s) Due, dated Apr. 28, 2021.
U.S. Appl. No. 15/959,215, Notice of Allowance and Fee(s) Due, dated May 7, 2021.

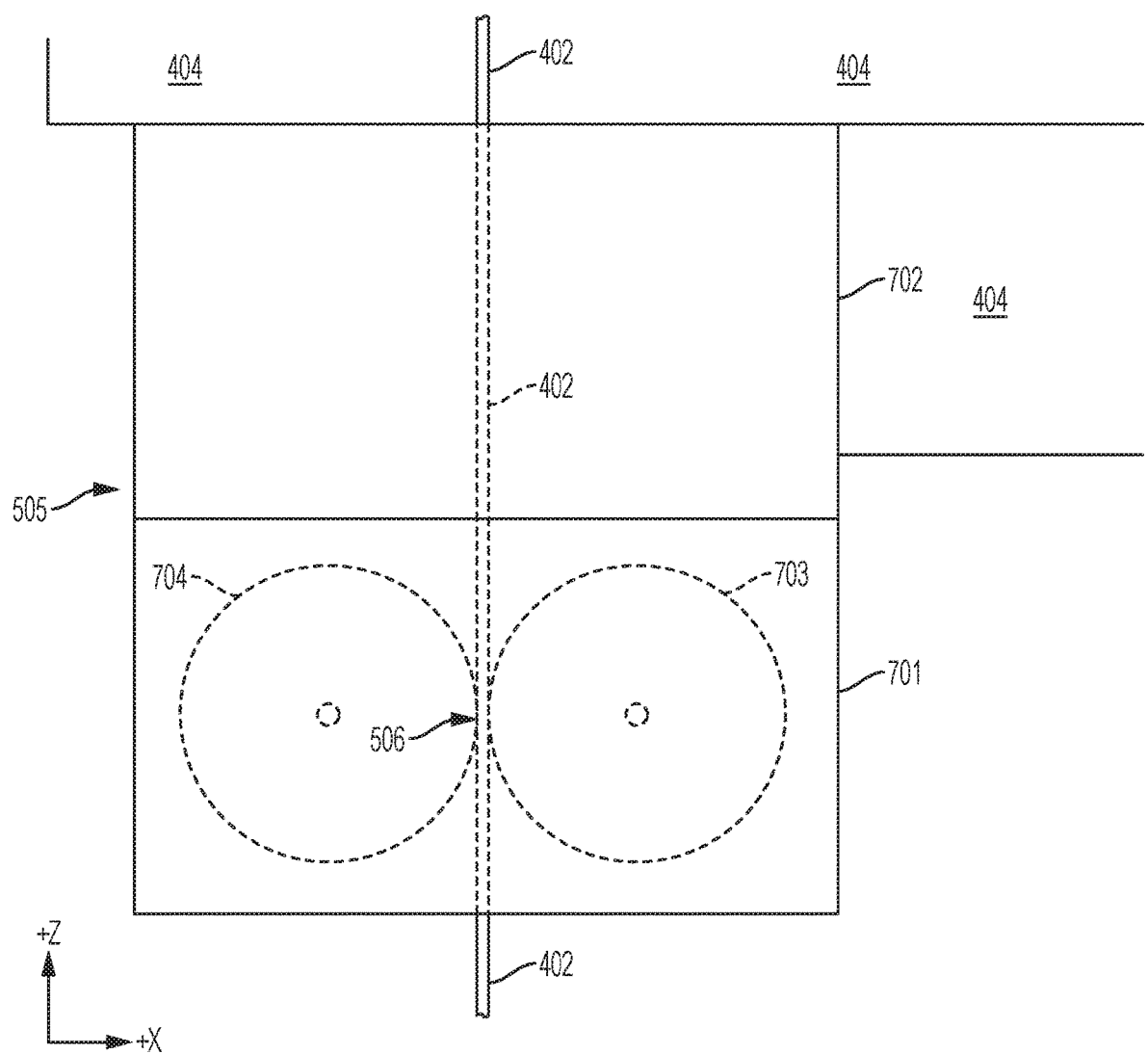

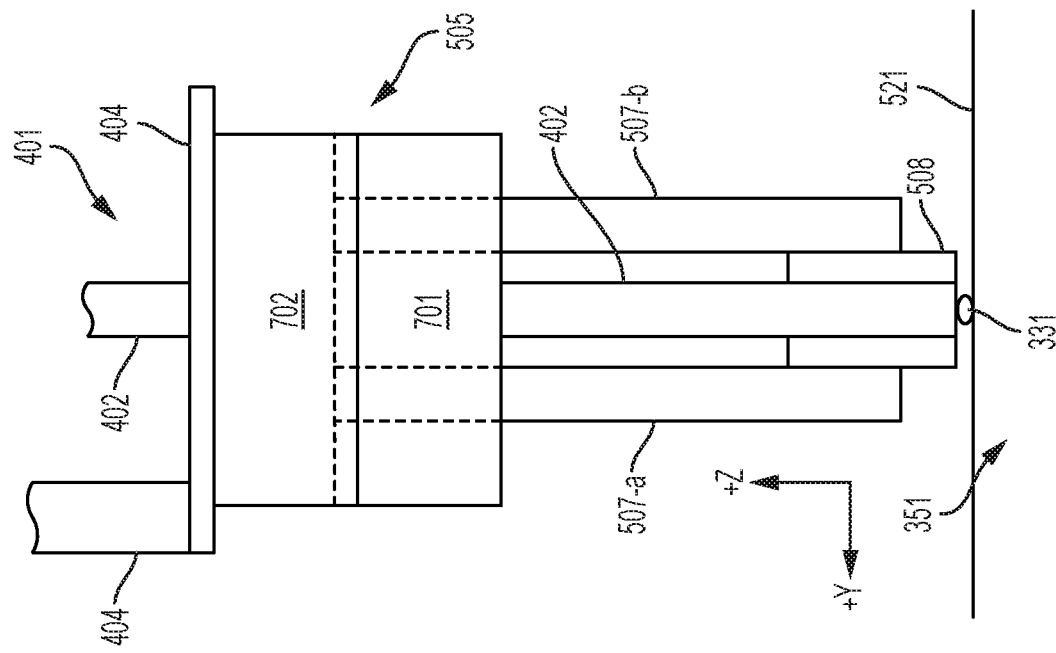
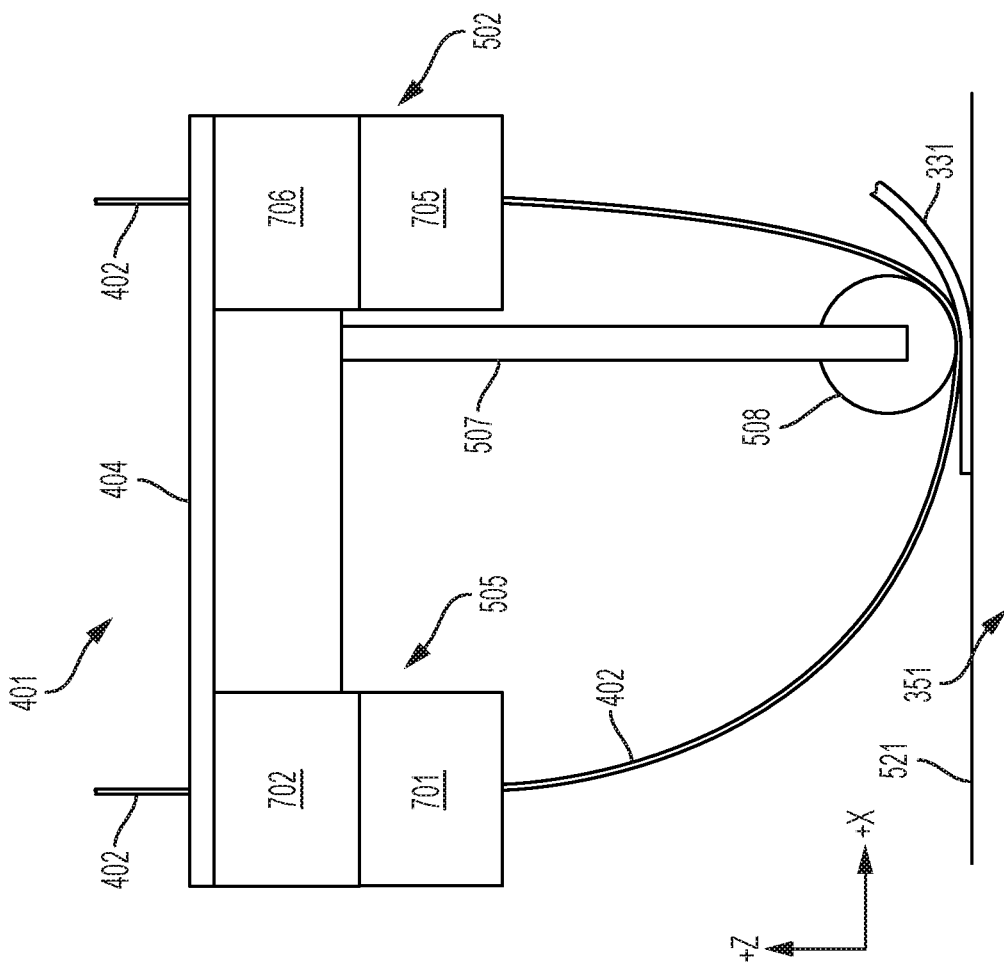

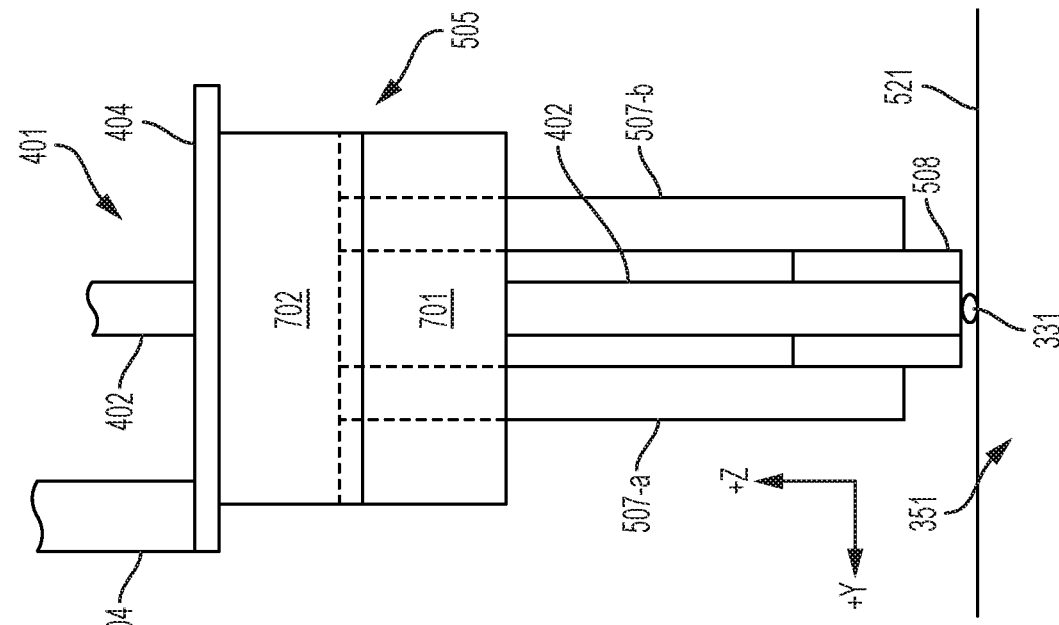
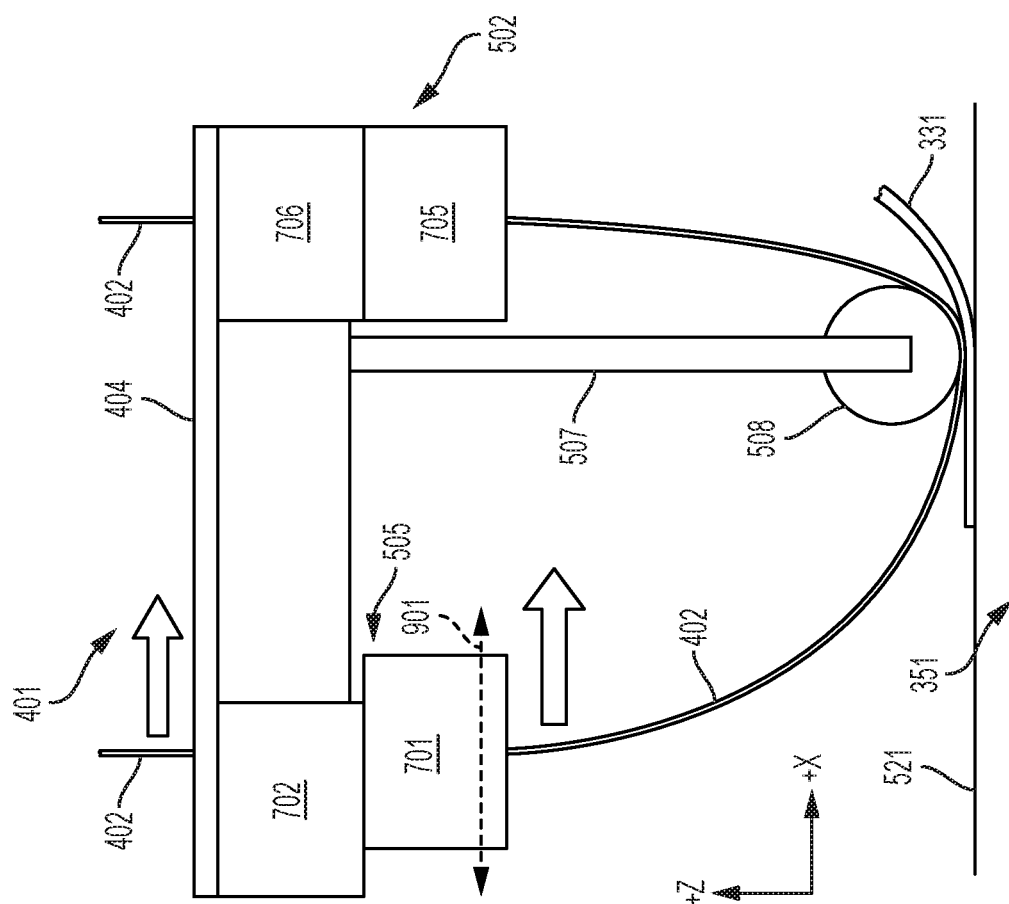

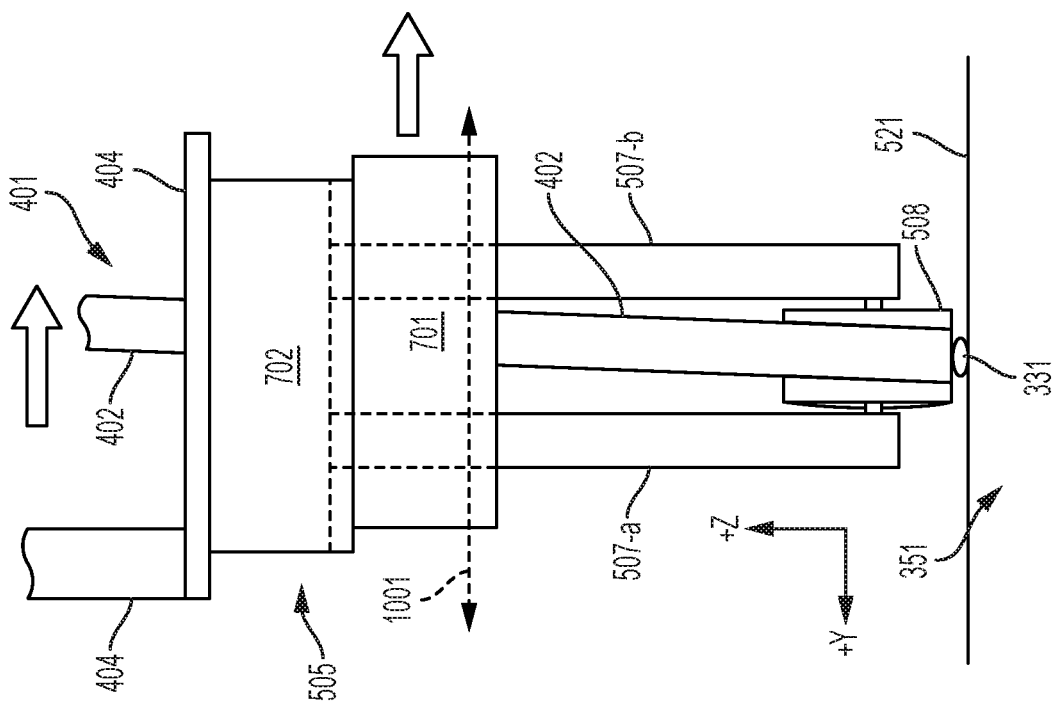
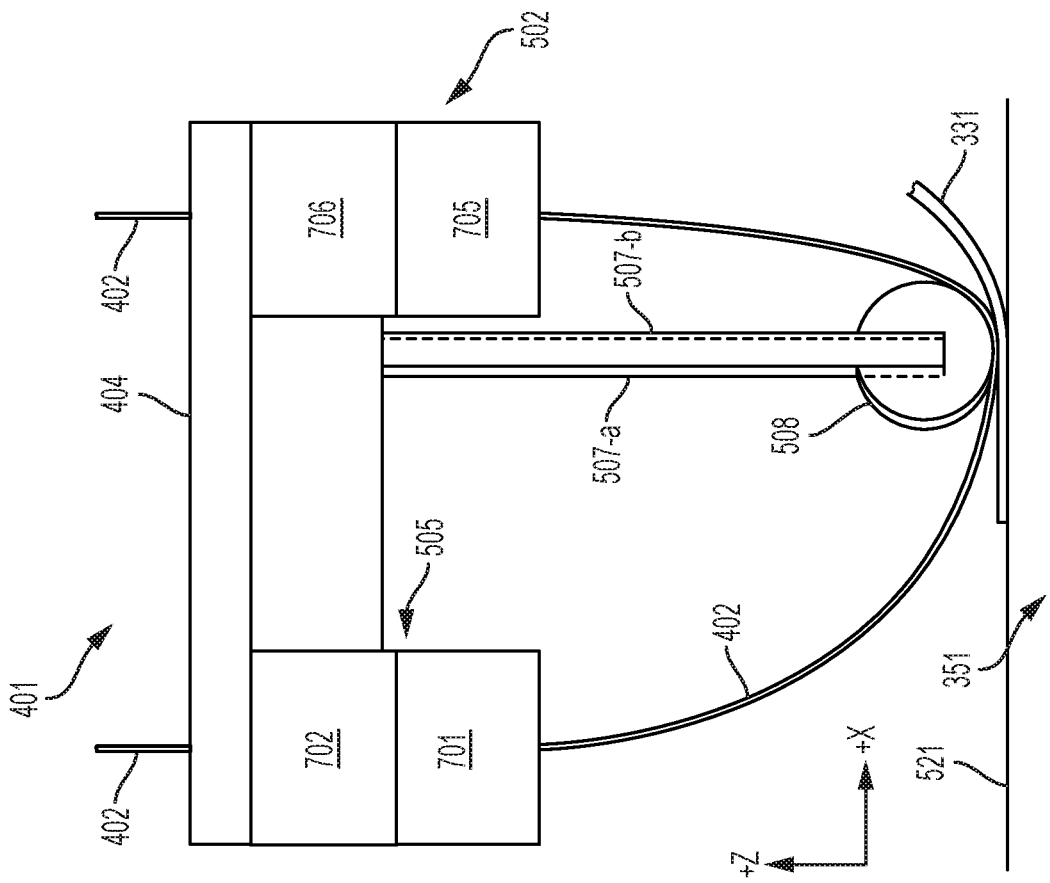

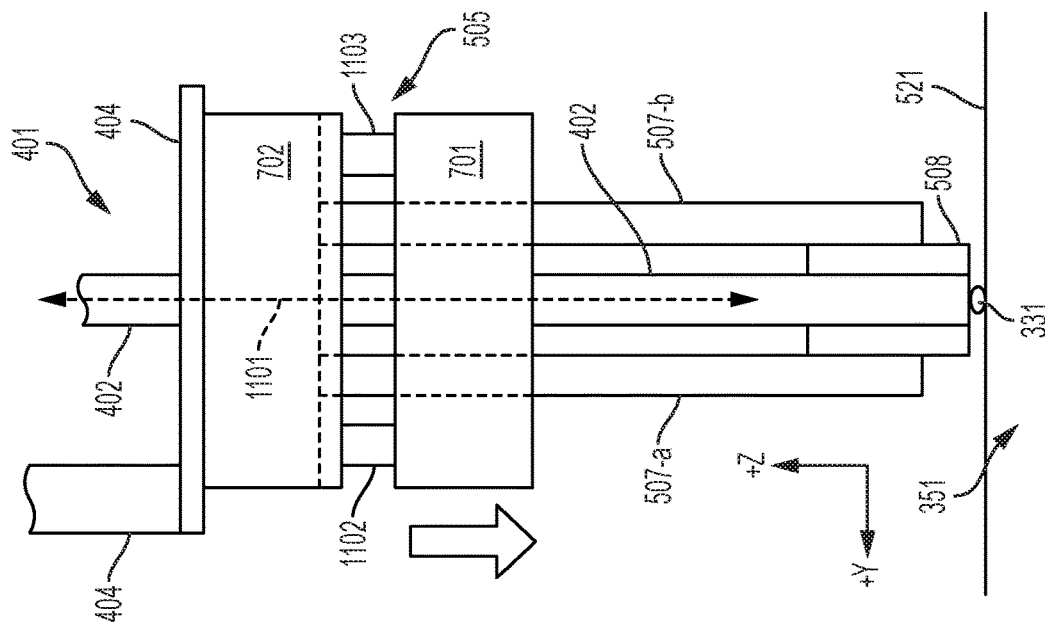
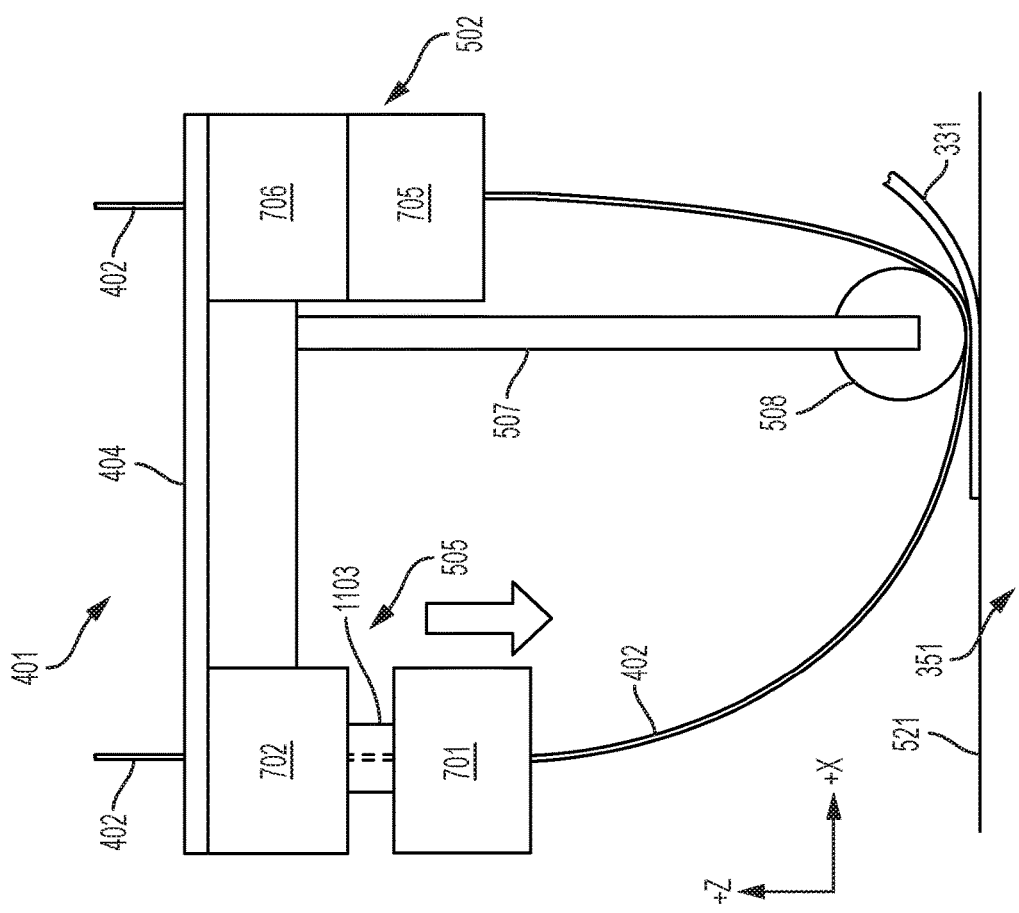

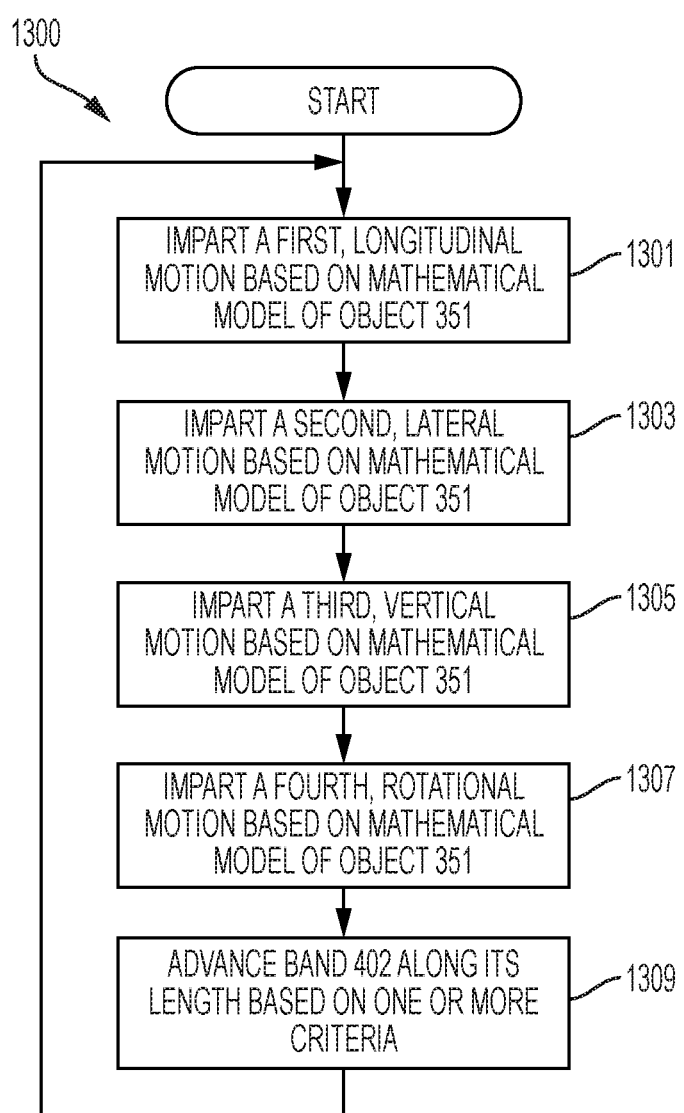

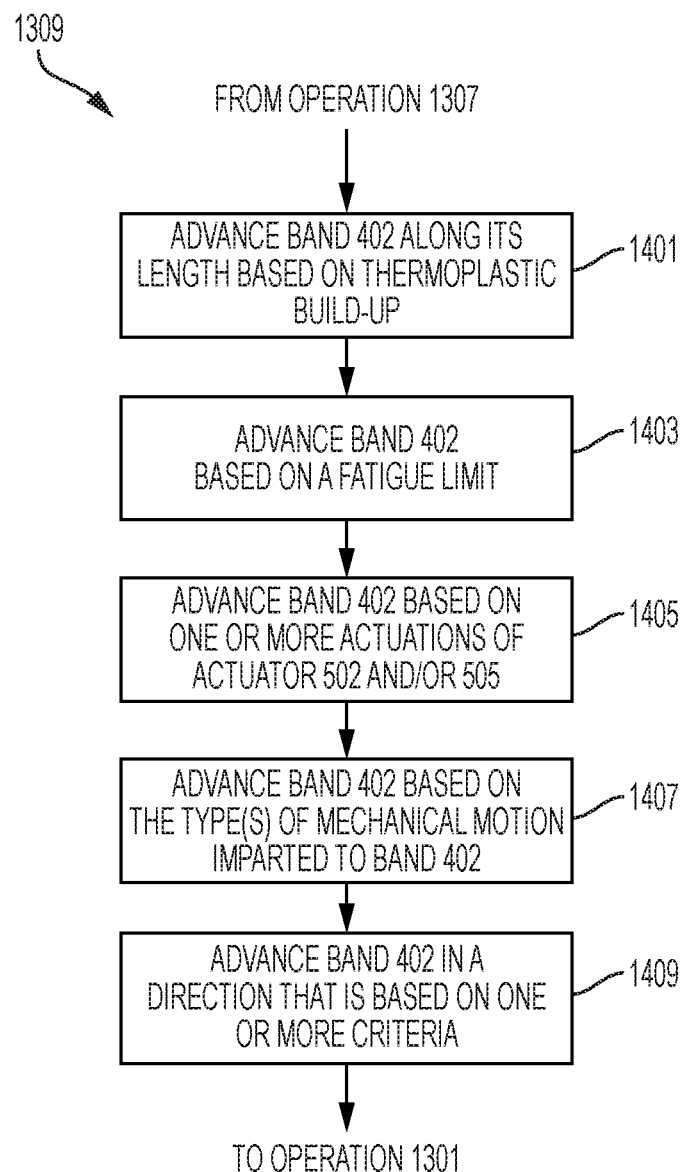

VARIABLE-CONTOUR COMPACTION ROLLER

CROSS REFERENCE TO RELATED APPLICATIONS

This application is related to "Variable-Contour Compaction Press," application Ser. No. 15/959,213, and "Self-Cleaning Variable-Contour Compaction Press," application Ser. No. 15/959,215, both of which are incorporated by reference herein in their entirety.

FIELD OF THE INVENTION

The present invention relates to additive manufacturing of three-dimensional objects in general, and, more particularly, to a deposition head featuring a moving band that acts as a roller for compacting a filament onto a surface of an object being manufactured.

BACKGROUND

In general, there are two complementary approaches to manufacturing an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "three-dimensional (3D) printing"—is the subject of intense research and development because it enables objects with complex geometries to be manufactured without molds or dies. Furthermore, 3D printing enables the mass customization of objects with different dimensions and characteristics.

In at least one 3D printing technique, the object is built by providing a thermoplastic filament to a deposition head on a robotic arm. The thermoplastic filament comprises a continuous tow of carbon fibers that is impregnated with thermoplastic. The deposition head heats and deposits the thermoplastic filament as one or more runs of material, via a roller. After it is deposited, each run quickly solidifies and fuses with the runs that it touches. The technique builds a three-dimensional object from a mathematical model of the object.

FIG. 1 in the prior art depicts an illustration of the components of additive manufacturing system 100, which uses a thermoplastic filament as described above. Additive manufacturing system 100 comprises: controller 101, build chamber 102, turntable 110, deposition platform 111, robot 121, deposition head 122, filament source 130, and thermoplastic filament 131. Manufacturing system 100 is used to manufacture object 151.

Controller 101 comprises the hardware and software necessary to direct build chamber 102, robot 121, deposition head 122, and turntable 110, in order to manufacture object 151. The controller also directs at least some of the components that are part of deposition head 122. Controller 101 comprises computer-aided design/computer-aided manufacturing (CAD/CAM) functionality in order to control the aforementioned components.

Build chamber 102 is a thermally-insulated, temperature-controlled environment in which object 151 is manufactured.

Turntable 110 comprises a stepper motor under the control of controller 101 that is capable of rotating platform 111 (and, consequently object 151) around an axis of rotation.

Platform 111 comprises hardware on which object 151 is manufactured. Platform 111 is configured to receive heated filament deposited by deposition head 122. In some embodiments, platform 111 is referred to as a "build plate."

Robot 121 is capable of depositing a run of material from any three-dimensional coordinate in build chamber 102 to any other three-dimensional coordinate in build chamber 102 with deposition head 122 at any approach angle. To this end, robot 121 comprises a multi-axis, mechanical arm under the control of controller 101.

Deposition head 122 comprises hardware that is under the control of controller 101 and that deposits filament 131, which may partially or wholly contain one or more fiber strands.

Thermoplastic filament 131 comprises a cylindrical towpreg of continuous 12K carbon fiber that is impregnated with a thermoplastic and is supplied from filament source 130. Filament 131 is deposited as a "run of material" onto object 151 or platform 111, or both.

FIG. 2 in the prior art depicts a schematic representation of the spatial relationship of deposition head 122 to segments of thermoplastic filament 131, including previously deposited segments of filament that make up object 151. Deposition head 122 comprises: roller 201, roller axle 202, roller guide 203, and filament guide 204, and a laser (not shown). Roller 201, roller axle 202, roller guide 203, filament guide 204, and the laser are held in relative position by a support structure that is not shown in FIG. 2.

Roller 201 is a metal wheel with roller bearings on roller axle 202 that is positioned by roller guide 203. Roller 201 rotates freely on roller axle 202 and presses filament 131, heated by the laser, into previously deposited filament of object 151. Filament 131 is pressed into the previously deposited filament to facilitate adhesion and eliminate voids.

Filament guide 204 guides filament 131 into position so that roller 201 can press it into the previously deposited filament. At least a portion of filament guide 204 is transparent to the light from the laser so that the laser can add heat to filament 131 while filament 131 is within filament guide 204.

Where the surface of object 151 is flat, or convex, or even slightly concave, the contour of the surface does not impede roller 201 in its ability to press filament 131, as depicted in FIG. 2. However, where the surface of object 151 is excessively concave, the surface concavities can impede roller 201's ability to press filament 131 into the object being manufactured. In particular, where the compaction roller has too large a diameter to follow the contour of a concavity, the roller might be unable to properly press the filament into position. The roller might also be unable to properly press the filament into position if a wall of a concavity is sloped in a direction that is inconsistent with the direction of travel of deposition head 122, even if the concavity is not excessively concave in relation to the roller's diameter.

What is needed is a system for applying filament to an object being manufactured, without at least some of the disadvantages in the prior art.

SUMMARY OF THE DISCLOSURE

In at least one 3D-printing technique, a deposition head deposits thermoplastic filament on an object being manufactured and presses the filament in place with a compaction roller. Where the surface of the object is excessively concave or sloped in a direction inconsistent with the deposition head's direction of travel, the surface's contours can impede the roller's ability to press the filament into position.

In order to accommodate some contours of the object's surface, the deposition head itself has to be moved—for example, to align the compaction roller with the gradient of a surface contour—in at least some 3D-printing techniques in the prior art. Depending on the alignment required, however, moving the deposition head might lead to unwanted results. For example, moving the deposition head in order to yaw the compaction roller (i.e., to the left or right) in relation to the surface can result in a breakage of fibers in the thermoplastic filament, thereby compromising the strength of the filament.

The present invention enables the deposition of thermoplastic filament onto an object whose surface has one or more concavities, without at least some of the disadvantages in the prior art. In accordance with the illustrative embodiment of the present invention, a deposition head comprises an assembly having an assembly body and a band for compacting a filament onto the surface of the object. One or more actuators are mounted on the assembly body at a front mounting point or a rear mounting point, or both, and are used to shape the band to a desired contour.

The band is made of a flexible material, is connected to the one or more actuators, and is capable of being driven along its length. The intermediate portion of the band between the first and second connecting points is curved toward the surface of the object being manufactured to enable the portion of the band to come into contact with and to compact the filament onto the object being manufactured.

One or more drive wheels drive the band along its length, thereby enabling the band to act as a virtual roller at or near the point of compaction. The band assembly further comprises a compaction support extending from the assembly body toward an inward-facing surface of the band. The compaction support is configured to support the band at the point of compaction and comprises a roller in contact with the band at its inward-facing surface. The roller, or some other type of low-friction member or surface of the support, permits the band to move along its length.

In accordance with the illustrative embodiment, each actuator is capable of imparting a mechanical motion to the band. For example, an actuator mounted at the rear mounting point on the assembly body can be configured to impart, at the connecting point on the band, a rotational motion, a linear lateral motion, a linear longitudinal motion, or a linear vertical motion. Additional actuators can be used at the connecting point on the band to impart compound motion to the band, and one or more actuators can be used at the front of the band, in addition to the rear, in order to achieve additional types of motion at the connecting points, and while the band is moving along its length.

By moving one or both connecting points on the band using the actuators, the band itself can assume different shapes and, in particular, different contours at or near the point of compaction of the filament being deposited, and while the band is acting as a virtual roller. Advantageously, the virtual roller enabled by the moving band can be varied, by a controller, in order to match the changing contours of the surface of the object being manufactured, including aligning the virtual roller with the gradient of each contour. This improves the deposition and compaction of the filament.

An illustrative deposition head for pressing a filament at a point of compaction on a surface of an article of manufacture comprises: a filament drive that is configured to feed the filament toward the point of compaction; a heat source that is configured to heat the filament as it passes through an area between the filament drive and the point of compaction; a body having a front mounting point and a rear mounting point that are arranged along a longitudinal axis; a first actuator that is connected to the rear mounting point; a front wheel that is connected to the front mounting point; a rear wheel that is connected to the rear mounting point through the first actuator; and a band in the form of a loop, and having a circumference and a shape, arranged such that the front of the loop and the front wheel are in contact with each other at a first point of contact, the back of the loop and the rear wheel are in contact with each other at a second point of contact, and the bottom of the loop faces toward the surface of the article; wherein at least one of the front wheel and the rear wheel is configured to drive the band along the circumference at a drive velocity that correlates to a relative velocity of the deposition head and the surface of the article; and wherein the first actuator is configured to change the shape of the band through the rear wheel, such that the band conforms, at the point of compaction, to at least some concavities in the surface of the article.

Another illustrative deposition head for pressing a filament at a point of compaction on a surface of an article of manufacture comprises: a body having a front mounting point and a rear mounting point arranged along a longitudinal axis; a front wheel that is connected to the front mounting point; a rear wheel that is connected to the rear mounting point; a first actuator that is connected to the body at one of the front mounting point and the rear mounting point, and through which one of the front wheel and the rear wheel is connected to the respective first or second mounting point, a band in the form of a loop, and having a circumference and a shape, arranged such that the front of the loop is in contact with the front wheel at a first point of contact, the back of the loop is in contact with the rear wheel at a second point of contact, and the bottom of the loop faces toward the surface of the article; and a first compaction support extending from the body downward toward the band, and configured to support the band at the point of compaction; wherein at least one of the front wheel and the rear wheel is configured to drive the band along the circumference at a drive velocity that correlates to a relative velocity of the deposition head and the surface of the article; and wherein the first actuator is configured to change the shape of the band by imparting a first mechanical motion to one of the first point of contact and the second point of contact of the band, in relation to the body.

Yet another illustrative deposition head for pressing a filament at a point of compaction on a surface of an article of manufacture comprises: a body having a front mounting point and a rear mounting point arranged along a longitudinal axis; a front wheel that is connected to the front mounting point; a rear wheel that is connected to the rear mounting point; a first actuator that is connected to the body at the front mounting point and the rear mounting point, and through which the front wheel is connected to the front mounting point; a second actuator that is connected to the body at the rear mounting point, and through which the rear wheel is connected to the rear mounting point; and a band in the form of a loop, and having a circumference and a shape, arranged such that the front of the loop is in contact with the front wheel at a first point of contact, the back of the loop is in contact with the rear wheel at a second point of contact, and the bottom of the loop faces toward the surface of the article; wherein at least one of the front wheel and the rear wheel is configured to drive the band along the circumference at a drive velocity that correlates to a relative velocity of the deposition head and the surface of the article; wherein the first actuator is configured to change the shape of the band through the front wheel by imparting a first mechanical motion to the first point of contact of the band, in relation to the body; and wherein the second actuator is configured to change the shape of the band through the rear wheel by imparting a second mechanical motion to the second point of contact of the band, in relation to the body.

BRIEF DESCRIPTION OF THE DRAWINGS

FIGS. 7A and 7B depict an orthographic front-view illustration and left-side-view illustration, respectively, of rear actuator 505.

FIGS. 8A and 8B depict respective, orthographic front- and left-side-views of a lower portion of band assembly 401, with actuators 502 and 505 in their neutral positions.

FIGS. 9A and 9B depict respective, orthographic front- and left-side-views of a lower portion of band assembly 401, depicting linear longitudinal motion.

FIGS. 10A and 10B depict respective, orthographic front- and left-side-views of a lower portion of band assembly 401, depicting linear lateral motion.

FIGS. 11A and 11B depict respective, orthographic front- and left-side-views of a lower portion of band assembly 401, depicting linear vertical motion.

FIG. 13 depicts salient operations of method 1300 according to the illustrative embodiment.

FIG. 14 depicts operation 1309 for advancing band 402 along its length.

DETAILED DESCRIPTION

For the purposes of this specification, the following terms and their inflected forms are defined as follows:

The term "band" is defined as a strip or loop of material.
The term "vertical" is defined as at right angles to a horizontal plane.
The term "lateral" is defined as sideways.
The term "longitudinal" is defined as running lengthwise (front-to-back) rather than across.
The term "convex" is defined as having an outline or a surface that is curved or rounded outward.
The term "concave" is defined as having an outline or a surface that is hollowed or rounded inward.
The term "contour" is defined as an outline, especially one representing or bounding the shape or form of something.
The term "to conform" is defined to mean "to be similar in form or type."

The deposition head of the illustrative embodiment is described in this specification in the context of a band that presses thermoplastic filament onto an object being manufactured in an additive manufacturing system. As those who are skilled in the art will appreciate, however, after reading this specification, the disclosed deposition head can be used in various other applications, and with either filaments or other slender threadlike objects or fibers.

Figure 1:
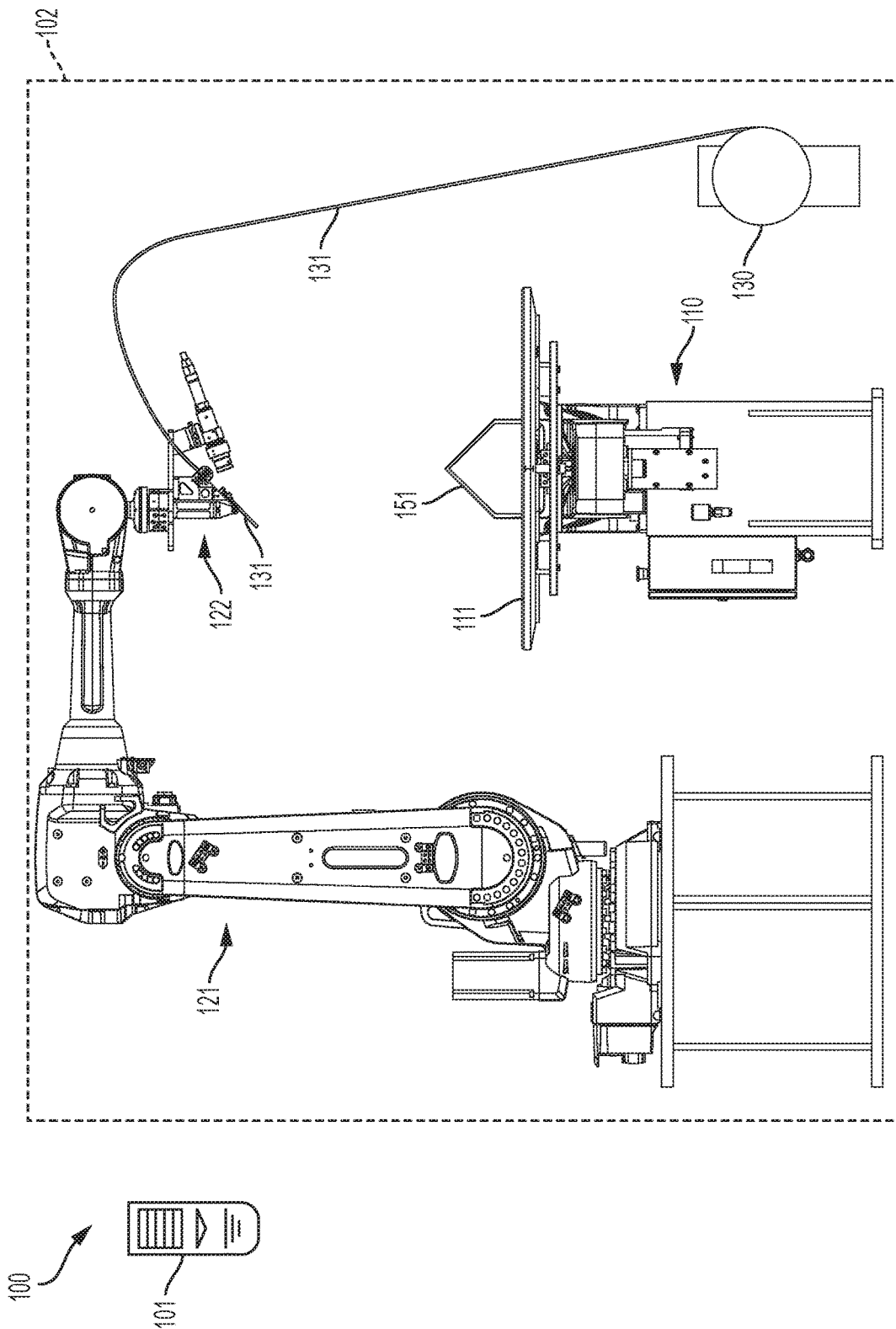
FIG. 1 in the prior art depicts an illustration of the components of additive manufacturing system 100.
Figure 2:
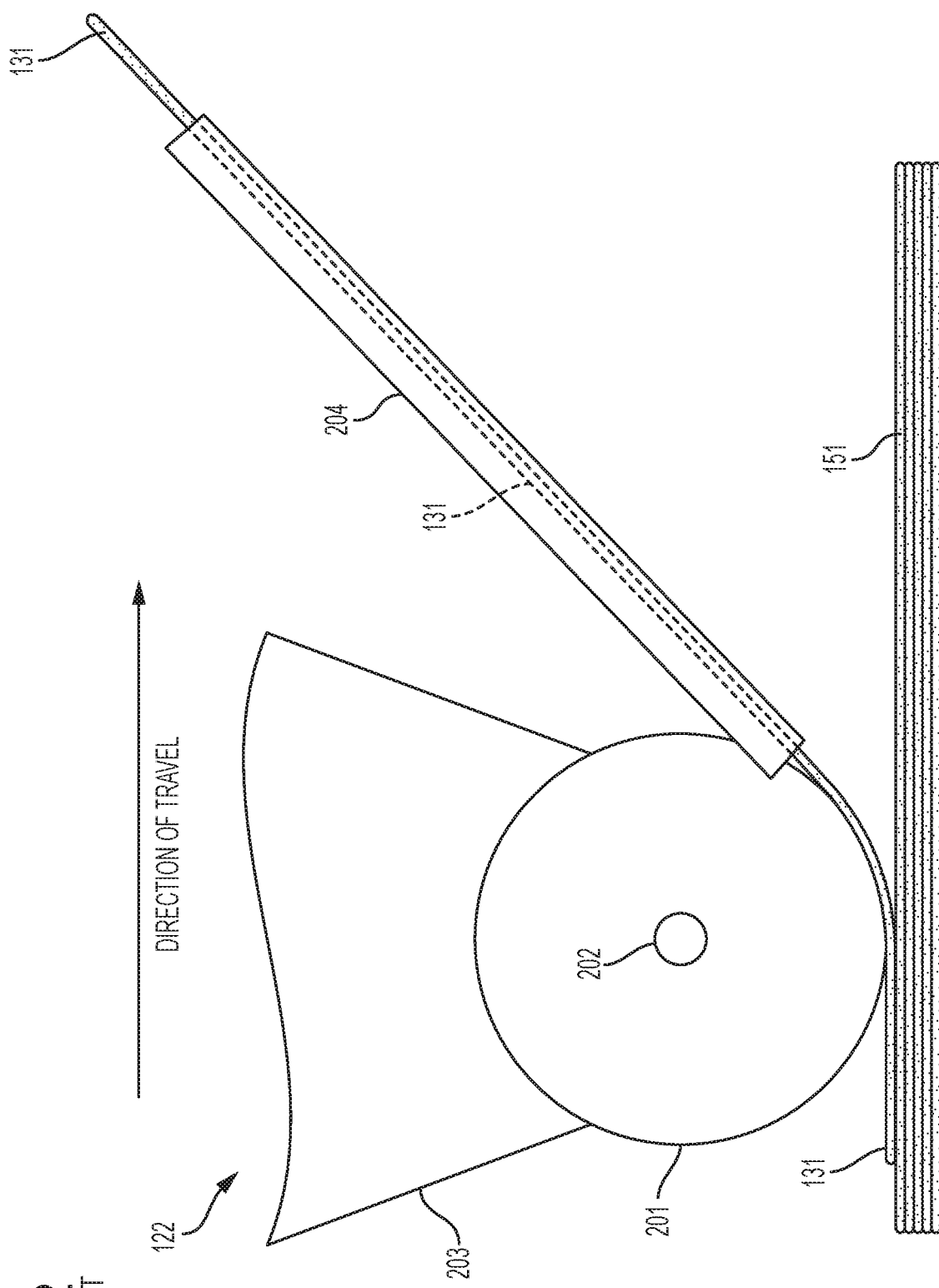
FIG. 2 in the prior art depicts a representation of the spatial relationship of deposition head 122 to a segment of thermoplastic filament 131.
Figure 3:
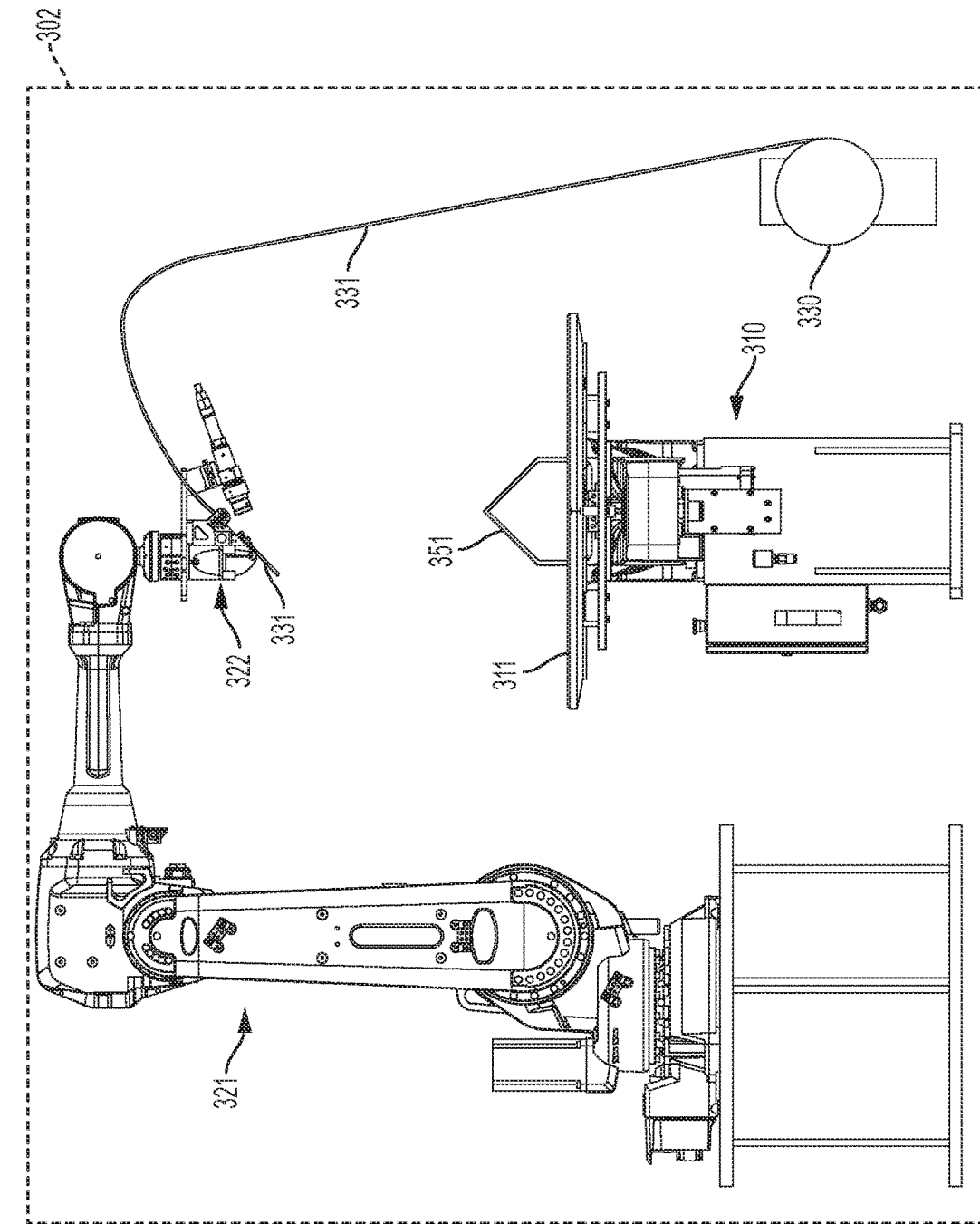
FIG. 3 depicts a front-view illustration of the salient components of additive manufacturing system 300 in accordance with the illustrative embodiment of the present invention.

FIG. 3 depicts a front-view illustration of the salient components of additive manufacturing system 300 in accordance with the illustrative embodiment of the present invention. Additive manufacturing system 300 comprises: controller 301, build chamber 302, turntable 310, deposition platform 311, robot 321, deposition head 322, filament source 330, and thermoplastic filament 331. A purpose of manufacturing system 300 is to manufacture object 351, which is an article of manufacture or an apparatus.

Controller 301 comprises the hardware and software necessary to direct build chamber 302, robot 321, deposition head 322, and turntable 310, in order to manufacture object 351. The controller also directs at least some of the components that are part of deposition head 322, as described below. Controller 301 comprises computer-aided design/ computer-aided manufacturing (CAD/CAM) functionality in order to control the aforementioned components. It will be clear to those skilled in the art, after reading this disclosure, how to make and use controller 301.

Build chamber 302 is a thermally-insulated, temperature-controlled environment in which object 351 is manufactured. It will be clear to those skilled in art how to make and use build chamber 302.

Turntable 310 comprises a stepper motor under the control of controller 301 that is capable of rotating platform 311 (and, consequently object 351) around an axis of rotation. In particular, turntable 310 is capable of:
  i. rotating platform 311 clockwise around the axis of rotation from any angle to any angle, and
  ii. rotating platform 311 counter-clockwise around the axis of rotation from any angle to any angle, and
  iii. rotating platform 311 at any rate, and
  iv. maintaining (statically) the position of platform 311 at any angle.

In some embodiments of the present invention, turntable 310 is further capable of being positioned in general (i.e., not being limited to rotation around the aforementioned axis), under the control of controller 301, and accordingly is sometimes referred to as a "build plate positioner." It will be clear to those skilled in the art how to make and use turntable 310.

Platform 311 comprises hardware on which object 351 is manufactured. Platform 311 is configured to receive heated filament deposited by deposition head 322. In some embodiments, platform 311 is referred to as a "build plate."

As those who are skilled in the art will appreciate, platform 311 need not be coupled to a turntable, in order for it to receive the heated filament. In any event, it will be clear to those skilled in the art how to make and use platform 311.

Robot 321 is capable of depositing a run of material from any three-dimensional coordinate in build chamber 302 to any other three-dimensional coordinate in build chamber 302 with deposition head 322 at any approach angle. To this end, robot 321 comprises a multi-axis (e.g., six-axis, seven-axis, etc.), mechanical arm under the control of controller 301. A non-limiting example of robot 321 is the IRB 4600 robot offered by ABB. It will be clear to those skilled in the art how to make and use robot 321.

Deposition head 322 comprises hardware that is under the control of controller 301 and that deposits filament 331, which may partially or wholly contain one or more fiber strands. Deposition head 322 is described below and in regard to FIG. 4. Deposition head 322 is an example of an "end effector" in relation to robot 321, being attached to robot 321 at the robot's wrist.

Thermoplastic filament 331 comprises a cylindrical tow-preg of continuous 12K carbon fiber that is impregnated with a thermoplastic and is supplied from filament source 330 (e.g., a spool, etc.). In some alternative embodiments, filament 331 is impregnated with something other than, or in addition to, a thermoplastic. It will be clear to those skilled in the art, after reading this disclosure, how to make and use alternative embodiments of the present invention in which thermoplastic filament 331 has a different fiber composition, such as one described in U.S. patent application Ser. No. 14/184,010, which is incorporated by reference herein.

Thermoplastic filament 331 is deposited as a "run of material" onto object 351 or platform 311, or both. For purposes of clarity, filament 331 is depicted in FIG. 3 as being separate from object 351. The particular shape of object 351 as depicted has been selected for pedagogical purposes; however, additive manufacturing system 300 is capable of building any of a variety of objects.

Figure 4:
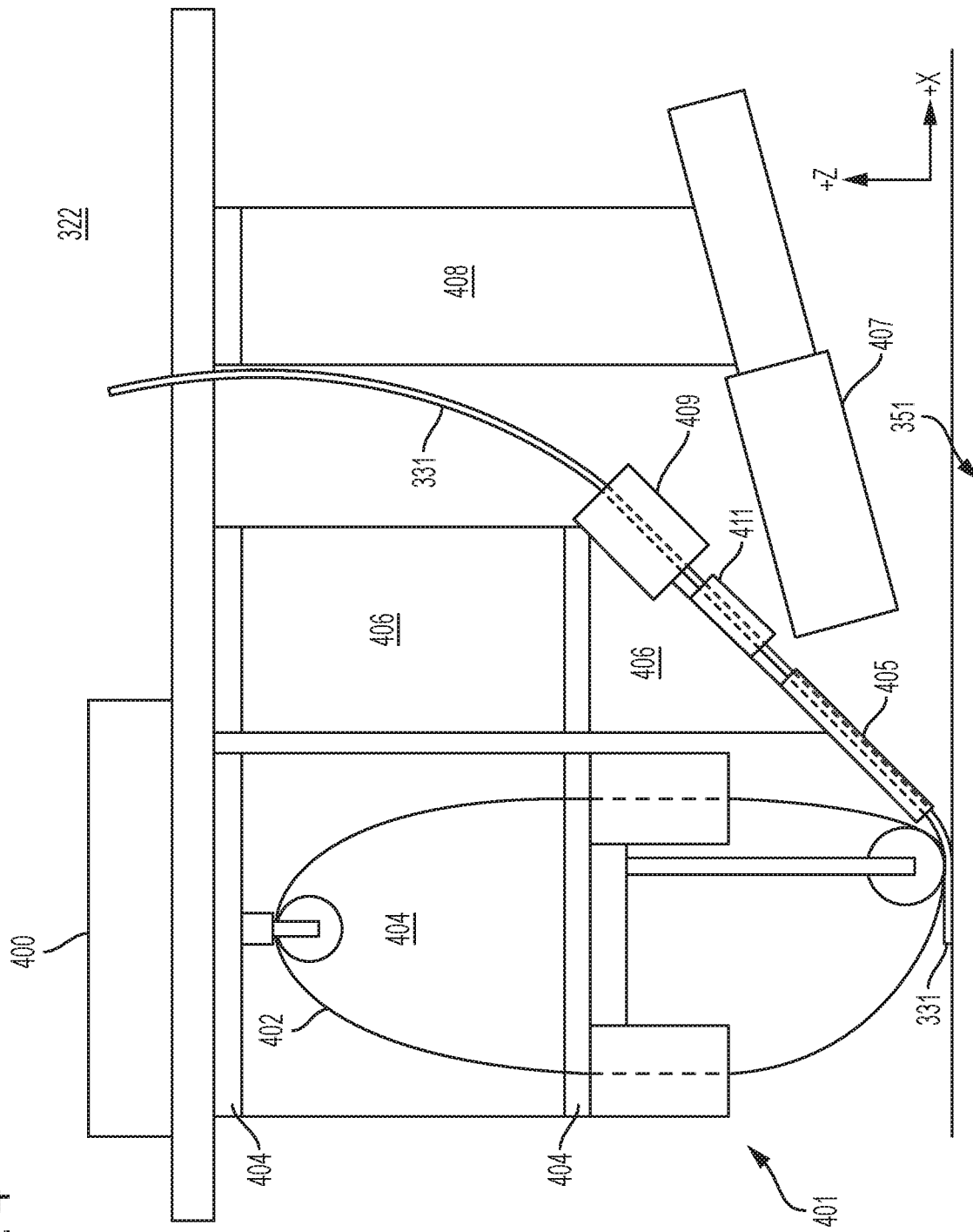
FIG. 4 depicts an orthographic front view illustration of deposition head 322.

FIG. 4 depicts an orthographic front view illustration of deposition head 322. Deposition head 322 comprises: deposition head mount 400, band assembly 401 that includes band 402 and band assembly body 404, filament guide 405, filament guide support 406, heat source 407, heat source support 408, filament drive 409, and cutter 411, interconnected as shown. As those who are skilled in the art will appreciate after reading this specification, one or more of the elements that are depicted as being part of deposition head 322 can instead be part of robot 321 or a different part of additive manufacturing system 300.

In regard to deposition head 322, the various terms that are used to describe direction, including "vertical", "horizontal", "lateral", "longitudinal", "downward", and "upward", are defined with respect to deposition head 322 and band assembly 401, unless otherwise specified. For example, if the bottom of deposition head 322—and, by association, the bottom of band assembly 401—is rotated forward with respect to the base of robot 321, then the upward direction of band assembly 401 is correspondingly rotated backward as a result.

Mount 400 of deposition head 322 comprises one or parts that are configured to mount the other components of deposition head 322 to the arm of robot 321.

Band assembly 401 comprises band 402, band assembly body 404, and additional components that are configured to operate in accordance with the illustrative embodiment, as described below and in regard to FIGS. 5A and 5B.

Filament guide 405 is configured to guide filament 331 provided by filament source 330, toward the deposition surface. Filament guide 405 comprises a plate through which filament 331 can be heated. The filament guide is attached to mount 400 via support 406. The details of filament guide 405 are taught in co-pending U.S. patent application Ser. No. 15/827,721, entitled "Filament Guide," filed on Nov. 30, 2017, which is incorporated by reference for the purposes of disclosing how it is made and used in conjunction with the deposition of heated filaments of thermoplastic.

In some embodiments of the present invention, filament guide 405 is fluidically coupled to a conduit, which is configured to provide a gas from a source of the gas to filament guide 405, in particular to filament 331 within guide 405. In some embodiments of the present invention, the gas that is used has properties enabling it to displace oxygen such that combustion is inhibited when filament 331 is heated by heat source 407. For example and without limitation, the gas can be nitrogen.

Heat source 407 is a heating device configured to heat filament 331 while the filament is moving through guide 405. Heat source 407 comprises a laser, configured to emit electromagnetic radiation in the form of infrared light. In some alternative embodiments of the present invention, the laser emits electromagnetic radiation in a different form, while in some other embodiments heat source 407 uses a heat source other than a laser, or emits thermal energy that which might be in a form other than electromagnetic radiation, or both. In some embodiments of the presenting invention, the laser in heat source 407 can be a Laserline LDM-800 diode laser that heats both a portion of a segment of filament 331 and a portion of a segment of previously-deposited filament 351 under the control of controller 301. It will be clear to those skilled in the art, after reading this disclosure, how to make alternative embodiments of the present invention that use a different laser.

The particular source of the heat is sufficient to heat the thermoplastic in a portion of filament 331 prior to the portion reaching the point of compaction on the deposition surface. When heated in this way by heat source 407, the thermoplastic in the filament becomes pliable and adhesive, and can be pressed and deposited by band 402. The heat source is configured to produce a temperature at filament 331 that is high enough to make the thermoplastic pliable and adhesive, but not too high. If the thermoplastic is too cool, it is not sufficiently pliable or adhesive, and if the thermoplastic is too hot, it melts and its viscosity becomes too low. When filament 331 is moving continuously, heat source 407 heats a continuum of affected portions of the filament.

Heat source 407, including the laser, is controlled by controller 301. The heat source is attached to mount 400 via support 408.

Filament drive 409 is configured to feed filament 331 at a feed velocity controlled by controller 301. Drive 409 feeds the filament forward, in particular toward and through filament guide 405 toward the point of compaction. In some embodiments of the present invention, the feed velocity is important in regard to design considerations of the drive mechanism of band 402. In some embodiments of the present invention, drive 409 is attached to mount 400 via its own support member.

Cutter 411 comprises a cutting mechanism that is configured to cut filament 331, as needed and under the control of controller 301. The cutting mechanism is constructed and arranged to cut filament 331 at a location at or near, or upstream from, filament guide 405.

Figure 5A:
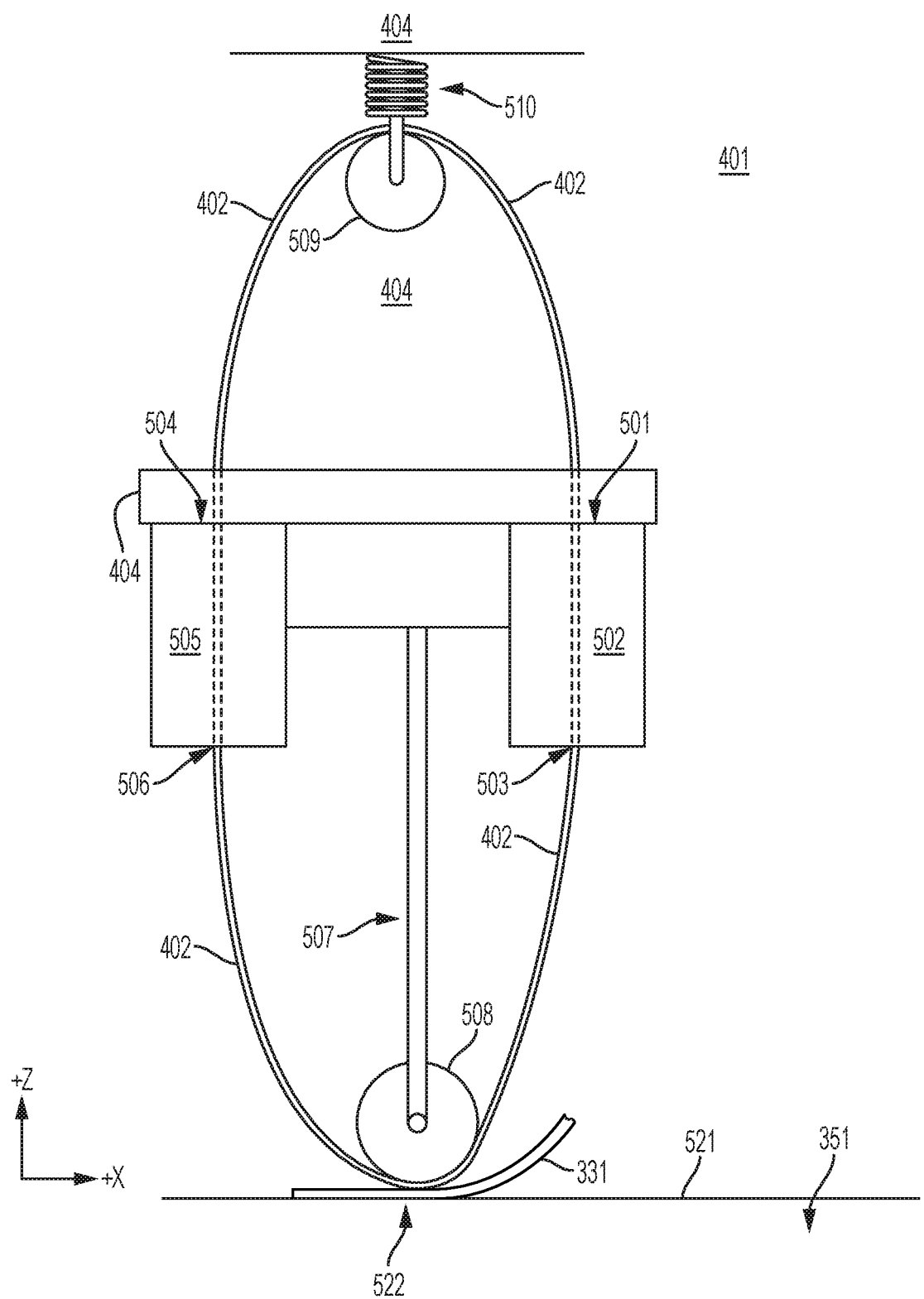
FIGS. 5A and 5B depict an orthographic front-view illustration and left-side-view illustration, respectively, of some of the components of deposition head 322 that interact with band 402
Figure 5B:
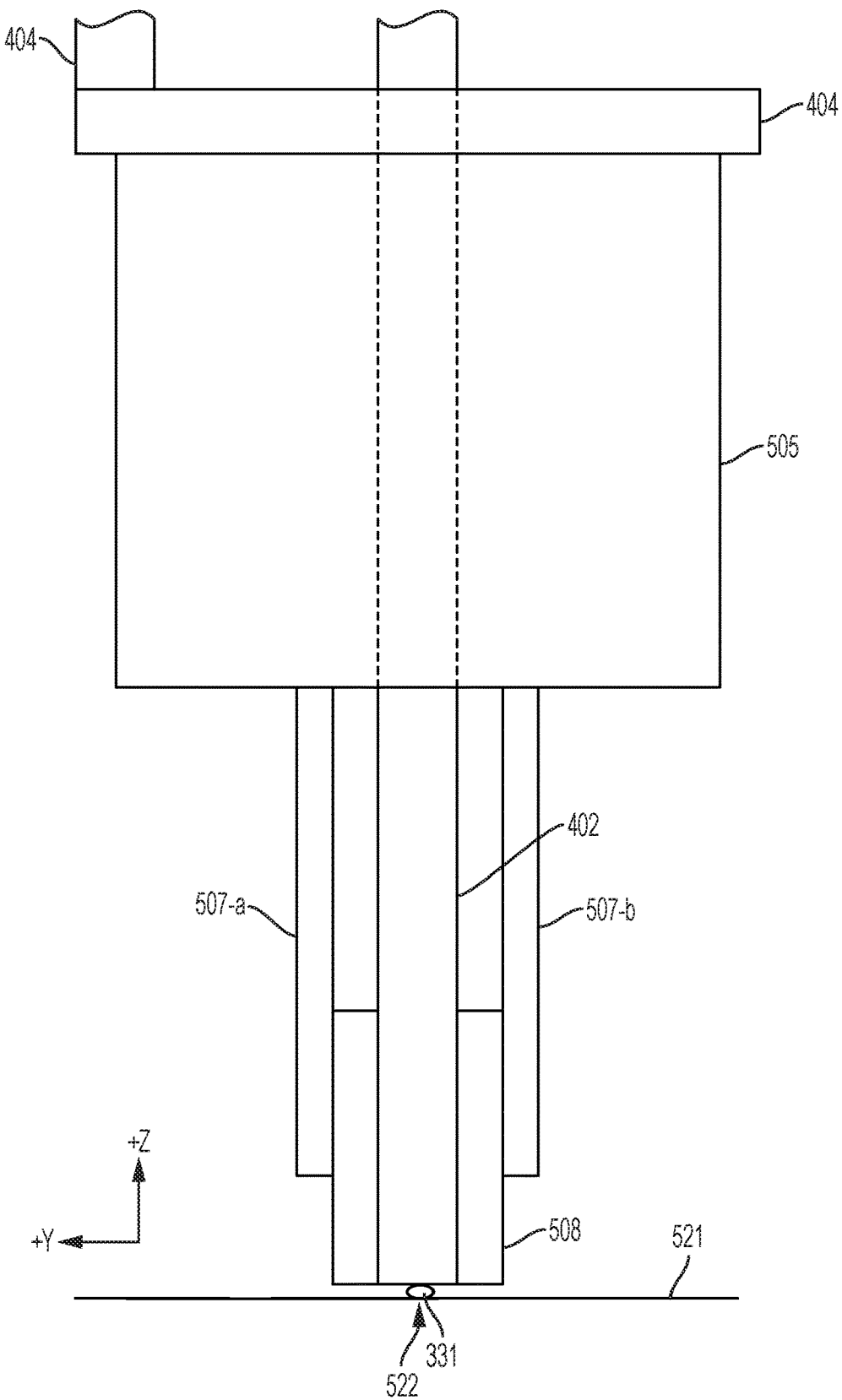

FIGS. 5A and 5B depict an orthographic front-view illustration and left-side-view illustration, respectively, of some of the components of deposition head 322 that interact with band 402 of band assembly 401, in depositing and compacting filament 331. For clarity purposes, only portions of filament 331 that enter cutter 411 and filament guide 405, and that leave filament guide 405, are depicted.

Band assembly 401 comprises band 402, band assembly body 404, actuator 502, actuator 505, lower band roller 508, compaction support 507, upper band roller 509, and spring assembly 510, interconnected as shown. Band assembly body 404 has a front end and a rear end along a longitudinal axis, and has a front mounting point 501 that disposed toward the front end and a rear mounting point 504 that is disposed toward the rear end, to which actuator 502 and actuator 505 are respectively connected. Mounting points 501 and 504 are arranged along the longitudinal axis of body 404. As seen from behind deposition head 322, band assembly body 404 is C-shaped, having a top, left, and bottom region; as those who are skilled in the art will appreciate after reading this specification, however, body 404 can be a different shape in some alternative embodiments of the present invention.

Band 402 is a flat, thin loop of flexible material. As depicted in FIG. 5A, band 402 is in the form of a loop having a circumference and a shape. In some alternative embodiments of the present invention, band 402 is in the form of a strip curved downward toward object 351. Band 402 has an inward-facing surface, which faces lower band roller 508 and compaction support 507, and an outward-facing surface, which faces filament 331 during deposition of the filament.

In order to deposit filament 331, band 402, as supported by compaction support 507 and band assembly body 404, is configured to apply a pressing force between i) filament 331, when heated by heat source 407, and ii) deposition surface 521 at point of compaction 522. Deposition surface 521 can be a surface of platform 311 or a surface of object 351. The pressing force is generated via the arm of robot 321 being controlled by controller 301, and transferring the force through body 404 and compaction support 507 to band 402 at the point of compaction. For the purposes of this specification, point of compaction 522, by definition, is always "under" the band at the point of compaction, as opposed to being at a fixed point or area on platform 311 or object 351.

Band 402 is capable of holding a defined shape for a predetermined length of time, based on one or more supports propping it up, as described below. The defined shape enables band 402 to conform to the surface of object 351. Furthermore, band 402 is capable of changing its shape to other defined shapes and is capable of doing so repeatedly. In order to meet these requirements, band 402 is made of a material with suitable fatigue characteristics—in particular, a material having a very high fatigue limit (i.e., the stress below which the material does not fatigue). To this end, band 402 is made of tempered AISI 1095 steel because of its suitable fatigue characteristics. In some alternative embodiments of the present invention, band 402 is made of a different material, but one still having suitable fatigue characteristics. The surface of band 402 should be as smooth as possible to reduce fouling (i.e., from the thermoplastic in filament 331) and can be coated with Teflon™ or some other suitable substance to reduce friction load.

The thickness of band 402 is determined by the stress imposed on the band, in terms of load attributed to the bending of the band (as described above) and, to a lesser extent, load attributed to friction (e.g., shoe friction). In regard to its thickness, band 402 has a uniform thickness on the order of 0.002" to 0.003" when used in conjunction with lower band roller 508 as described below. In some embodiments of the present invention, band 402 has a different thickness. For example and without limitation, for a band that advances relatively slowly relative to the motion of robot 321 (e.g., when the band is being used as a plow or a press rather than as a roller), band 402 can have a greater thickness such as 0.010".

In regard to its width, band 402 has a width that is dependent, at least in part, on the uncompacted diameter of filament 331 or on the compacted diameter of filament 331, or both. For example and without limitation, with an uncompacted diameter of 1.2 mm and a compacted diameter of 3.0 mm, the width of band 402 can be uniform and on the order of 5 mm to 8 mm. In some embodiments of the present invention, band 402 has a different width or one that is dependent on other factors. In some embodiments, the width of band 402 can be dependent on the number of filaments being concurrently deposited; for example, the greater the number of filament, the greater the width. In some embodiments, the width of band 402 can be dependent on the type of material being deposited; for example, if tape is used instead of filament, the width of band 402 might be greater.

In regard to band 402 having a configuration as a loop, the weld line in the loop possibly introduces a failure point of the band itself. In order to prevent such a failure, the circumference of band 402 as a loop is made longer than the longest deposited segment of filament, and band 402 is rewound or repositioned by controller 301 frequently enough not to have the weld line come in contact with the filament. In some other embodiments of the present invention, controller 301 reduces the load on loop 402 as the weld line passes over the filament being deposited. In still some other embodiments of the present invention, band 402 is configured as a strip, instead of as a loop, in which the strip is maintained on two spools that are part of band assembly 401 (i.e., a front and rear spool); in this configuration, controller 301 rewinds strip 402 before the strip gets to its end.

As those who are skilled in the art will appreciate after reading this specification, characteristics of band 402 that are different from those described above other are possible in alternative embodiments of the present invention. For example and without limitation, the material of band 402 can vary (i.e., can be non-homogenous), the thickness of the band can be nonuniform, and the width of at least a portion of the band can be nonuniform (e.g., a concave edge, a convex edge, etc.).

In regard to the size of roller 508, the diameter of the roller is dependent, at least in part, on the thickness of band 402. Given the band thickness described above, the diameter of roller 508 can be 20 mm to 25 mm in some embodiments. In accordance with the illustrative embodiment, the diameter of roller 508 is directly proportional to the thickness of band 402.

The width of roller 508 is dependent, at least in part, on the width of band 402. Given the band width described above, the width of roller 508 can be 10 mm to 15 mm in some embodiments. In accordance with the illustrative embodiment, the width of roller 508 is directly proportional to the width of band 402. In some embodiments, a wider roller 508 can be better for compaction in surfaces with a single axis of curvature, while a narrower roller 508 can be better for compaction in surfaces with two axes of curvature.

Compaction support 507 extends from body 404 downward toward the inward-facing surface band 402 and is configured to support the band at (or near) point of compaction 522. In accordance with the illustrative embodiment, support 507 is connected to compaction roller 508, which is movably (e.g., rotatably, etc.) coupled to a vertical member of support 507 and is permitted to roll as band 402 moves. Roller 508 is also permitted to move, as needed, with additional degrees of freedom, depending on the movement of band 402. In some alternative embodiments of the present invention, support 507 has a different type of end than a roller (e.g., a shoe having a fixed shape to apply pressure to band 402 according to a predefined distribution of force over a compaction area, etc.).

Figure 6:
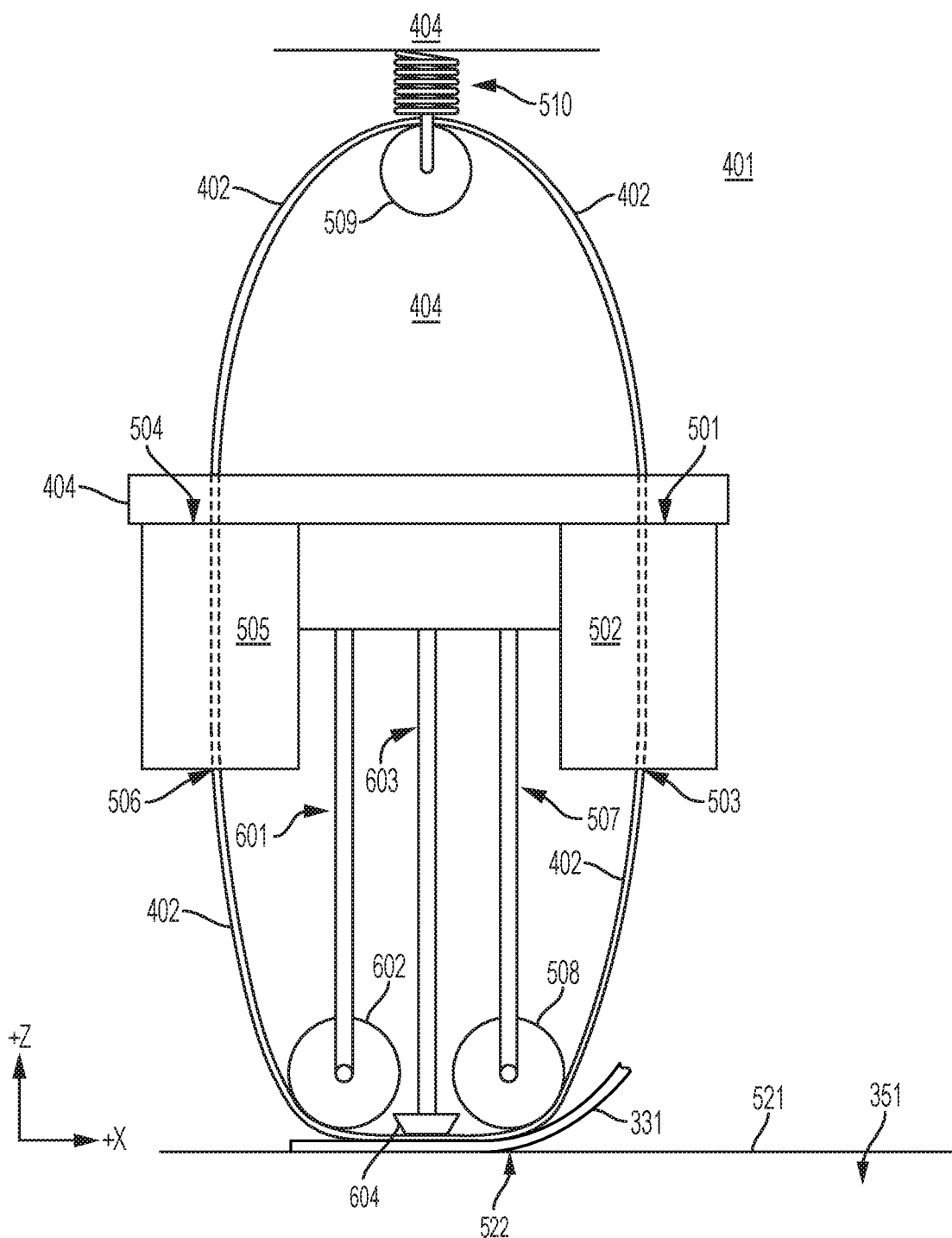
FIG. 6 depicts an orthographic front view of a configuration in which two compaction supports are present, including a second compaction support 601 connected to second compaction roller 602.

In some embodiments of the present invention, deposition head 322 comprises more than one compaction support. FIG. 6 depicts an orthographic front view of a configuration in which two compaction supports are present, including a second compaction support 601 connected to second compaction roller 602. Also depicted is third compaction support 603 connected to compaction shoe 604. As those who are skilled in art will appreciate, after reading this specification, a different number of compaction supports can be present than depicted in FIGS. 5 and 6, with or without compaction rollers and/or shoes. Furthermore, different combinations of compaction rollers and compaction shoes can be present (e.g., one roller with no shoe, one roller with one shoe, two rollers with no shoe, two rollers with one shoe, no rollers with one shoe, no rollers with two shoes, etc.). The use of more than one compaction support can be used to extend the contact area of band 402 with surface 521, for example and without limitation; high-speed deposition, for example, can benefit from extending the contact area in the aforementioned way.

Each actuator 502 and 505 is a component of a machine that is responsible for moving and controlling a mechanism or system—in this case the position of one or more points on band 402 and, as a result, the shape of the band with respect to surface 521. Each actuator utilizes control signals from controller 301 and a source of energy for turning a drive motor for rotational motion, moving a solenoid for linear motion, etc. As those who are skilled art will appreciate after reading this specification, band assembly 401 can have, in some alternative embodiments of the present invention, an actuator in the front only or an actuator in the rear only, in which cases band 402 is connected at its connecting point to mounting point on body through different means than the actuator. Actuators 502 and 505 are described below and in FIGS. 7A and 7B.

Band 402 is capable of a variety of configurations in relation to mounting points 501 and 504, or actuators 502 and 505, or both. In a first variation of the illustrative embodiment, in which band 402 is fixed, at least at certain times, band 402 has a connecting point 503 that is connected to front mounting point 501 through actuator 502 and a connecting point 506 that is connected to rear mounting point 504 through actuator 505. In this first variation, band 402 is connected to said elements in such a way that an intermediate portion of band 402 between connecting points 503 and 506 on the band is curved toward the surface 521.

Figure 7B:
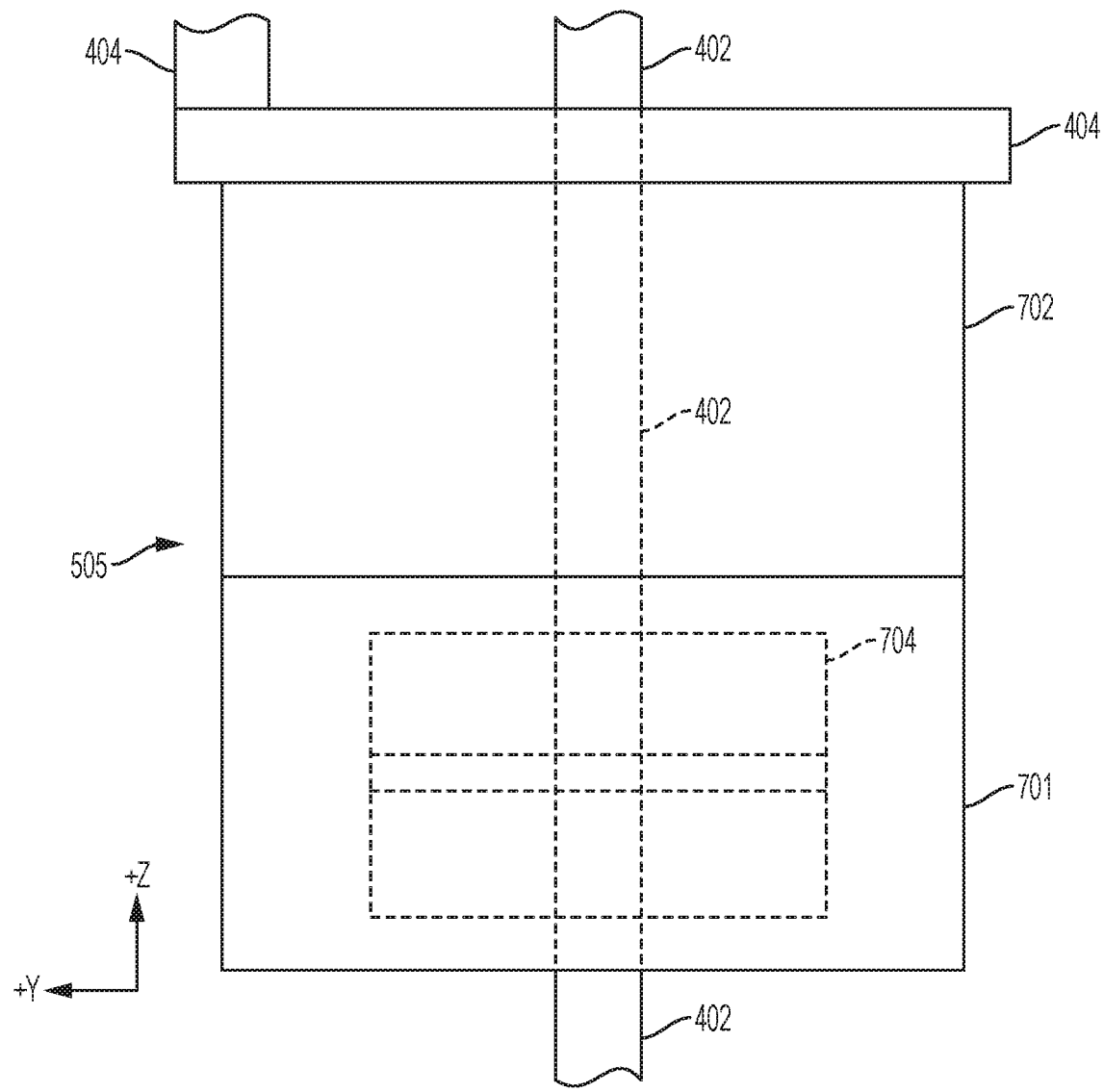

In a second variation of the illustrative embodiment, in which band 402 is moveable, at least at certain times, band 402 is arranged in such a way that the front of the band (e.g., a loop, a strip, etc.) and a front wheel are in contact with each other at point of contact 503, the back of the band and a rear wheel are in contact with each other at point of contact 506, and the bottom of band 402 faces downward toward surface 521. For example, FIGS. 7A and 7B depict an orthographic front-view illustration and left-side-view illustration, respectively, of rear actuator 505 comprising lower member 701, upper member 702, and rear wheels 703 and 704. Band 402 is seen as traversing members 701 and 702 (internally, depicted as dashed lines), and is in contact with at least one of rear wheels 703 and 704 (internal to member 701 and depicted as dashed lines) at point of contact 506.

Similarly, front actuator 502 comprises a lower and upper member (depicted in subsequent drawings as members 705 and 706, respectively), and at least one front wheel; band 402 traverses the members of the front actuator and is in contact with at least one of the front wheels at point of contact 503. Although actuator 502 is not depicted, actuator 505 as depicted in FIGS. 7A and 7B and as described herein is representative of any actuator in contact with band 402.

In addition to actuator-related components that are well-known in the art, members 701, 702, 705, and 706 also comprise any components related to guiding and stabilizing band 402 as it passes through each member.

In some embodiments of the present invention, components 502 and/or 505 can comprise multiple actuators for multiple movements, as depicted in subsequent drawings. Each actuator is configured to receive and respond to control signals from controller 301 in order to control each type of mechanical motion, such that a portion of the band conforms to the point of compaction.

At least one i) of the front wheel or wheels and ii) rear wheels 703 and/or 704 is configured to drive band 402 along the band's circumference if the band is a loop, or along the band's length if the band is a strip, and at a controllable drive velocity. Each drive wheel is connected to a controllable motor configured to drive a drive wheel in well-known fashion. In some embodiments of the present invention, the drive velocity of the band correlates to a relative velocity of deposition head 322 to surface 521. For example, if the band is configured to act as a roller, the drive velocity can be applied such that the band is driven forward to match the relative movement of the deposition head as it travels over the surface. In some embodiments of the present invention, a set of front and rear wheels are operated in such a way that the amount of tension that is present along the lower portion of band 402 is controlled to a particular range or amount.

As those who are skilled in the art will appreciate after reading this specification, one or more of the wheels coming in contact with band 402 can be connected to mounting points 501 or 504, either as part of an actuator (e.g., actuator 502, actuator 505, etc.) that is connected to a mounting point or separate from any actuator.

As explained above, lower member 701 of actuator 505 is connected to, or otherwise in contact with, band 402. Lower member 701 is capable of movement in relation to upper member 702, as explained below. It will be clear to those skilled in the art how to make and use actuator 505 such that member 701 moves according to a predetermined motion in relation to member 702 and based on a second control signal (e.g., from controller 301 as described below, etc.). Furthermore, it will be clear to those skilled in the art how to make and use actuator 505 such that one or both of wheels 703 and 704 are capable of driving band 402 in a predetermined direction (e.g., up, down, etc.) and based on a first control signal (e.g., from controller 301 as described below, etc.).

Band assembly 401 further comprises upper band roller 509, and spring assembly 510, which are configured to accommodate any slack that is in the upper part of band 402, wherein the slack is required in order to accommodate the rotation or linear movement of band 402 by one or more actuators.

In those embodiments of the present invention in which band 402 is a loop, a byproduct of changing the shape of band 402 beneath and between points of contact 503 and 506 is that the length of band that is above and between points 503 and 506 needs to accommodate what amounts to a deformation of the band. Accordingly, the distance along the portion of band 402 that is above and between points of contact 503 and 506 is greater than the distance along the portion of the band that is beneath and between points 503 and 506, in order to provide the necessary slack or play in the upper portion of band 402. In some embodiments of the present invention, the distance along the portion of band 402 that is above and between points of contact 503 and 506 is at least twice the distance along the portion of the band that is beneath and between points 503 and 506. As those who are skilled in the art will appreciate after reading this specification, a different ratio of distance between upper portion and lower portion of band 402 can be used.

FIGS. 8 through 12 depict different positions of a lower portion of band 402, depending on the type of movement imparted to the band by actuator 505. Although only actuator 505 is depicted as moving and according to one type of movement at a time, actuator 502 can move as well and according to any of the movements depicted in the subsequent drawings for actuator 505. Furthermore, each actuator, or group of multiple actuators, can be configured to impart multiple types of concurrent movement (compound motion), depending on whether multiple solenoids and/or motors are present in each actuator. Because actuators 502 and 505 are capable of movement and because band 402 is coupled to the actuators, it can be said each actuator is configured to change the shape of the band.

In the drawings that follow, scenarios are provided depicting rotation around a vertical axis, linear longitudinal motion, linear lateral motion, and linear vertical motion. As those who are skilled in the art will appreciate after reading this specification, however, an actuator can be configured to impart other types of motion, including rotation around other axes and linear motion along other axes than depicted.

FIGS. 8A and 8B depict respective, orthographic front- and left-side-views of a lower portion of band assembly 401, with actuators 502 and 505 in their neutral positions. In some alternative embodiments of the present invention, one or both actuators can a different neutral position than depicted.

FIGS. 9A and 9B depict respective, orthographic front- and left-side-views of a lower portion of band assembly 401. As depicted in these figures, actuator 505 is configured to change the shape of band 402 by imparting a linear longitudinal motion along longitudinal axis 901 at point of contact 506. This motion results in band 402 compressing or expanding, in relation to mounting point 504.

FIGS. 10A and 10B depict respective, orthographic front- and left-side-views of a lower portion of band assembly 401. As depicted in these figures, actuator 505 is configured to change the shape of band 402 by imparting a linear lateral motion along lateral axis 1001 at point of contact 506. This motion results in band 402 shifting left or right, in relation to mounting point 504. This motion also results, as depicted in FIGS. 10A and 10B, in roller 508 achieving a yawing movement to the left in relation to deposition head 322's direction of travel along surface 521. If deposition head 322 were instead turned as a whole to achieve the yawing movement, rather than shifting the band as depicted, this could introduce unwanted sliding of the roller and band against filament 331, possibly resulting in breaking of filament fibers. The motion produced in the manner depicted in FIGS. 10A and 10B avoids the sliding and possible breaking of the fibers.

As can be seen in FIG. 10B in particular, band 402 shifts sideways (i.e., toward the right). Depending on how band 402 is connected to member 701, member 701 might be required to rotate or swivel accordingly as it moves laterally, in order to accommodate the band.

FIGS. 11A and 11B depict respective, orthographic front- and left-side-views of a lower portion of band assembly 401. As depicted in these figures, actuator 505 is configured to change the shape of band 402 by imparting a linear vertical motion along vertical axis 1101 at point of contact 506. This motion results in band 402 shifting up or down, in relation to mounting point 504, exposing actuator struts 1102 and 1103 in FIG. 11B that support member 701 with respect to member 702 during the motion.

Figure 12B:
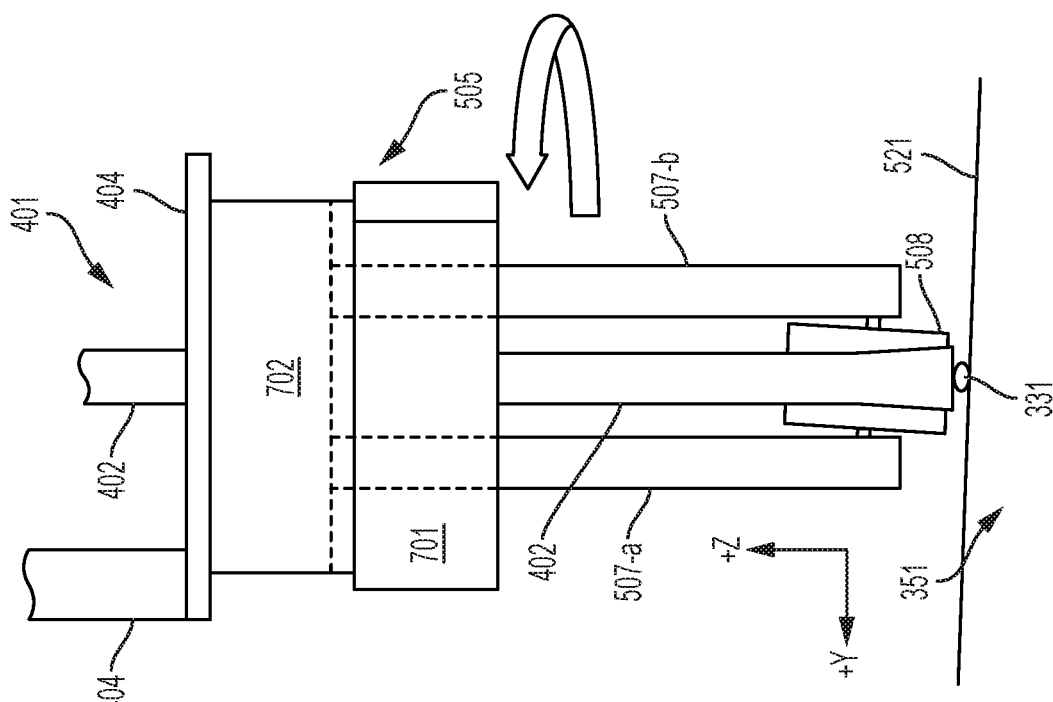
FIGS. 12A and 12B depict respective, orthographic front- and left-side-views of a lower portion of band assembly 401, depicting rotational motion.
Figure 12A:
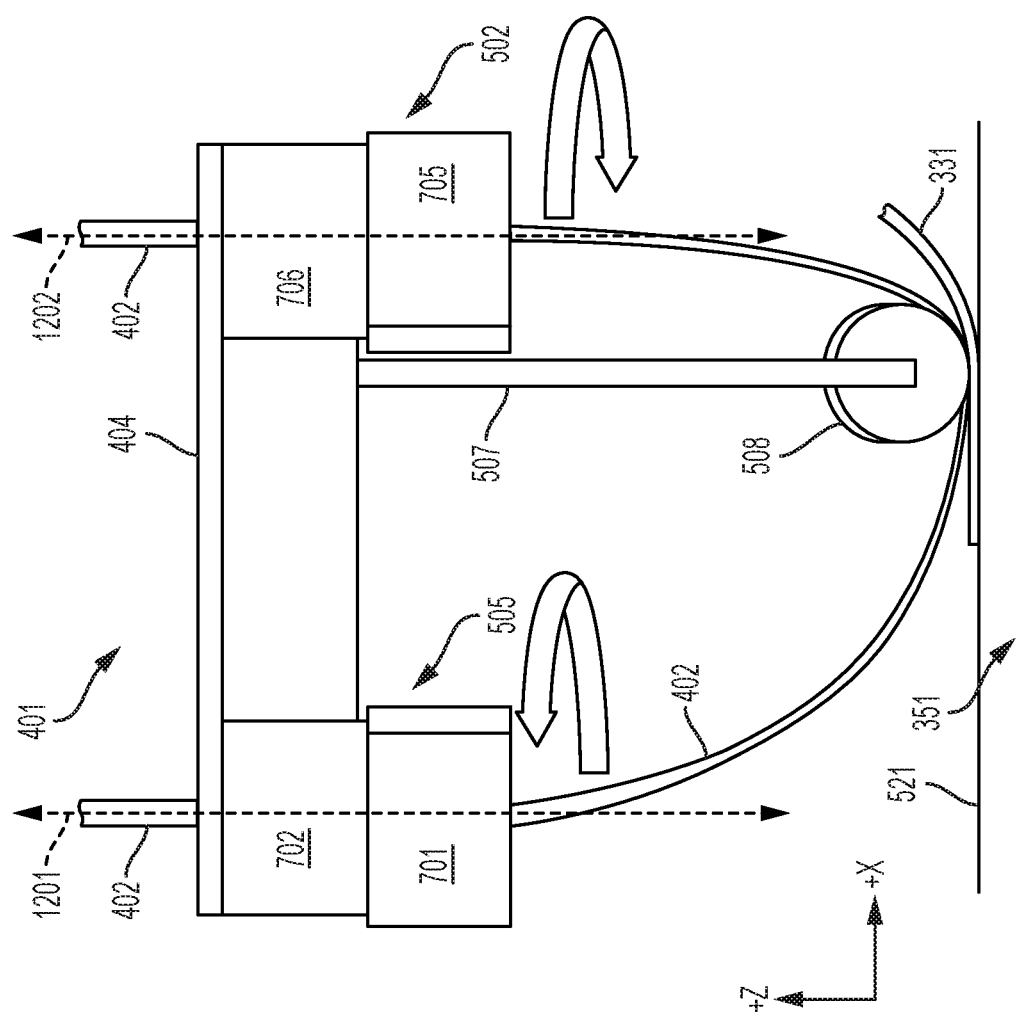

FIGS. 12A and 12B depict respective, orthographic front- and left-side-views of a lower portion of band assembly 401. As depicted in these figures, actuator 505 is configured to change the shape of band 402 by imparting a rotational motion about rotational axis 1201 at point of contact 506. This motion results in band 402 twisting to the left or to the right, in relation to mounting point 504. As also depicted, actuator 502 is configured to change the shape of band 402 by imparting a rotational motion about rotational axis 1202 at point of contact 503. This motion results in band 402 twisting to the left or to the right, in relation to mounting point 501.

As depicted in FIG. 12A, actuators 502 and 505 are twisting band 402 in opposite directions with respect to each other's axis. As a result of this, roller 508 rolls clockwise as depicted in FIG. 9B, enabling band 402 to conform a tilt of surface 521, for example. In some alternative embodiments of the present invention, the concavity can be conformed to by a combination of both twisting the band, as depicted, and tilting deposition head 322, or by only tilting deposition head 322, as needed.

As described earlier, actuator 502 can be configured similarly to actuator 505, in regard to imparting one or more of the aforementioned types of mechanical motion to band 402 at point of contact 503. Furthermore, the types of mechanical motion imparted by actuators 502 and 505 can be the same as each other or can be different from each other. For example and without limitation, one of the actuators can impart a rotational motion about a vertical axis and the other actuator can impart a rotational motion as well (e.g., in the same rotational direction, in the opposite rotational direction, etc.) or a linear (e.g., lateral, longitudinal, vertical, etc.) motion.

By imparting a predetermined mechanical motion the point of contact on band 402, an actuator is able to change the shape of the band in such a way that the band conforms, at least at point of compaction 522, to at least some concavities on surface 521. Depending on the mechanical motion being imparted, a desired motion can also be imparted to roller 508 (e.g., yaw, roll, etc.). Each type of mechanical motion can be applied in order to address a certain contour of the concavity, and each combination of mechanical motions being imparted by two or more actuators can be applied to address a certain contour not necessary addressable by a single actuator imparting a single type of mechanical motion.

FIG. 13 depicts salient operations of method 1300 according to the illustrative embodiment, by which controller 301 performs various functions related to controlling actuator 505. As those who are skilled in the art will appreciate after reading this specification, a similar method can be applied to controlling actuator 502 as well.

In regard to method 1300, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention.

It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

In accordance with operation 1301, and dependent on the computer model, controller 301 provides a control signal to actuator 505 to impart a linear longitudinal motion along longitudinal axis 901 at point of contact 506, as depicted in FIG. 9. Controller 301 previously received the computer model of object 351 prior to the start of the deposition process. In some embodiments of the present invention, the computer model is based on the object being manufactured from thermoplastic filament. The computer model is representative of one or more portions of one or more segments of filament 131 being used to manufacture object 351.

In accordance with operation 1303, and dependent on the computer model, controller 301 provides a control signal to actuator 505 to impart a linear lateral motion along lateral axis 1001 at point of contact 506, as depicted in FIG. 10.

In accordance with operation 1305, and dependent on the computer model, controller 301 provides a control signal to actuator 505 to impart a linear vertical motion along vertical axis 1101 at point of contact 506, as depicted in FIG. 11.

In accordance with operation 1307, and dependent on a stored, mathematical computer model of object 351, controller 301 provides a control signal to actuator 505 to impart a rotational motion about rotational axis 1201 at point of contact 506, as depicted in FIG. 12.

In accordance with operation 1309, and dependent on the computer model and/or one or criteria, controller 301 provides a control signal to the motor of the drive wheel of at least one of actuators 502 and 505. The control signal operates to cause the corresponding drive wheel to advance band 402 along its length by a first distance. Operation 1309 is described below and in regard to FIG. 14.

FIG. 14 depicts operation 1309 for advancing band 402 along its length. There can be various causes of controller 301 providing a control signal to advance band 402 along its length, in any combination thereof, as described below.

In accordance with operation 1401, and dependent on the computer model of object 351, controller 301 provides the control signal in operation 1309 based on thermoplastic build-up on a portion of band 402 that overlaps point of compaction 522. In some embodiments, the control signal is provided based on an estimate of thermoplastic build-up on the portion of band 402. Controller 301 advances the band sufficiently so that a fresh portion of band surface is exposed and then used for deposition and compaction. The advancement of band 402 can occur periodically, continuously, sporadically, and so on.

In accordance with operation 1403, and dependent on the computer model of object 351, controller 301 provides the control signal in operation 1309 based on the fatigue limit of material that constitutes band 402. For example and without limitation, a material with a relatively low fatigue limit might require more frequent advancements of band 402, while a material with a relatively high fatigue limit might require less frequent advancements of band 402, or none at all.

In accordance with operation 1405, and dependent on the computer model of object 351, controller 301 provides the control signal in operation 1309 dependent on one or more of the following, in any combination:

i. the number of times a control signal in operation 1301 has been provided to actuator 502 and/or 505,
    ii. the number of times a control signal in operation 1303 has been provided to actuator 502 and/or 505,
    iii. the number of times a control signal in operation 1305 has been provided to actuator 502 and/or 505, and
    iv. the number of times a control signal in operation 1307 has been provided to actuator and/or 505.

In accordance with operation 1407, and dependent on the computer model of object 351, controller 301 provides the control signal in operation 1309 based on the type of mechanical motion (e.g., rotational, linear longitudinal, linear lateral, linear vertical, etc.) that at least one of actuator 502 and/or 505 imparts to band 402, or the type of mechanical motion imparted to roller 508 (e.g., yaw left, yaw right, roll left, roll right, etc.), or both.

In accordance with operation 1409, and dependent on the computer model of object 351, controller 301 provides a control signal in operation 1309 to advance band 402 in a particular direction that is based on one or more criteria. For example and without limitation, the control signal from controller 301 can cause band 402 to be advanced in a direction opposite to that in which filament drive 409 feeds filament 331 to point of compaction 522, in response to thermoplastic build-up on the portion of band 402 exceeding a predetermined estimated value. As another example, during the deposition of a filament segment, the control signal from controller 301 can cause band 402 to be advanced along the same direction in which filament drive 409 feeds filament 331 to point of compaction 522, in those variations of the illustrative embodiment in which band 402 acts as a band roller in depositing filament 331.

In those variations of the illustrative embodiment in which band 402 is configured as a strip, instead of as a loop, the strip can be maintained on two spools that are part of band assembly 401 (i.e., a front and rear spool), as already described. In this configuration, controller 301 rewinds strip 402 (i.e., in the rewind direction) before the strip gets to its end. In order to facilitate this, controller 301 provides a control signal in operation 1309 based on i) if the band strip is configured to act as a compaction roller, the length(s) of one or more filament segments already deposited or about to be deposited onto surface 521, or ii) the estimated length of band strip remaining before it gets to its end, or both.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A deposition head for pressing a filament at a point of compaction on a surface of an article of manufacture, the deposition head comprising:
    a filament drive that is configured to feed the filament toward the point of compaction;
    a heat source that is configured to heat the filament as it passes through an area between the filament drive and the point of compaction;
    a body having a front mounting point and a rear mounting point that are arranged along a longitudinal axis;
    a first actuator that is connected to the rear mounting point;
    a front wheel that is connected to the front mounting point;

a rear wheel that is connected to the rear mounting point through the first actuator; and a band in the form of a loop, and having a circumference and a shape, arranged such that the front of the loop and the front wheel are in contact with each other at a first point of contact, the back of the loop and the rear wheel are in contact with each other at a second point of contact, and the bottom of the loop faces toward the surface of the article;

wherein at least one of the front wheel and the rear wheel is configured to drive the band along the circumference at a drive velocity that correlates to a relative velocity of the deposition head and the surface of the article; and wherein the first actuator is configured to change the shape of the band through the rear wheel, such that the band conforms, at the point of compaction, to at least some concavities in the surface of the article.

2. The deposition head of claim 1, wherein the first actuator is configured to change the shape of the band by imparting a rotational motion about a vertical axis at the second point of contact of the band.

3. The deposition head of claim 1 wherein the first actuator is configured to change the shape of the band by imparting a linear longitudinal motion at the second point of contact of the band.

4. The deposition head of claim 1 wherein the first actuator is configured to change the shape of the band by imparting a linear lateral motion at the second point of contact of the band.

5. The deposition head of claim 1 wherein the distance along the portion of the band that is above and between the first and second points of contact is greater than the distance along the portion of the band that is beneath and between the first and second points of contact.

6. The deposition head of claim 1, further comprising a second actuator that is connected to the front mounting point and through which the front wheel is connected to the front mounting point, wherein the second actuator is configured to change the shape of the band by imparting a mechanical motion at the first point of contact of the band.

7. The deposition head of claim 1, further comprising a compaction support extending from the body downward toward an upward-facing surface of the band, and configured to support the band at the point of compaction.

8. A deposition head for pressing a filament at a point of compaction on a surface of an article of manufacture, the deposition head comprising:

a body having a front mounting point and a rear mounting point arranged along a longitudinal axis;

a front wheel that is connected to the front mounting point;

a rear wheel that is connected to the rear mounting point;

a first actuator that is connected to the body at one of the front mounting point and the rear mounting point, and through which one of the front wheel and the rear wheel is connected to the respective first or second mounting point, a band in the form of a loop, and having a circumference and a shape, arranged such that the front of the loop is in contact with the front wheel at a first point of contact, the back of the loop is in contact with the rear wheel at a second point of contact, and the bottom of the loop faces toward the surface of the article; and a first compaction support extending from the body downward toward the band, and configured to support the band at the point of compaction;

wherein at least one of the front wheel and the rear wheel is configured to drive the band along the circumference at a drive velocity that correlates to a relative velocity of the deposition head and the surface of the article; and wherein the first actuator is configured to change the shape of the band by imparting a first mechanical motion to one of the first point of contact and the second point of contact of the band, in relation to the body.

9. The deposition head of claim 8, further comprising a second actuator that is connected to the body at one of the front mounting point and the rear mounting point, wherein the second actuator is configured to change the shape of the band by imparting a second mechanical motion to one of the first point of contact and the second point of contact of the band, in relation to the body.

10. The deposition head of claim 9 wherein the first mechanical motion is rotational motion about a vertical axis at the second point of contact of the band, and wherein the second mechanical motion is rotational motion about a vertical axis at the first point of contact of the band.

11. The deposition head of claim 9 wherein the first mechanical motion is rotational motion about a vertical axis at the second point of contact of the band, and wherein the second mechanical motion is linear lateral motion at the second point of contact of the band.

12. The deposition head of claim 9 wherein the first mechanical motion is rotational motion about a vertical axis at the second point of contact of the band, and wherein the second mechanical motion is linear longitudinal motion at the second point of contact of the band.

13. The deposition head of claim 9 wherein the first mechanical motion is linear lateral motion at the second point of contact of the band, and wherein the second mechanical motion is linear longitudinal motion at the second point of contact of the band.

14. The deposition head of claim 8 wherein the distance along the portion of the band that is above and between the first and second points of contact is greater than the distance along the portion of the band that is beneath and between the first and second points of contact.

15. The deposition head of claim 14 wherein the distance along the portion of the band that is above and between the first and second points of contact is at least twice the distance along the portion of the band that is beneath and between the first and second points of contact.

16. The deposition head of claim 8, further comprising a second compaction support extending from the body downward toward an upward-facing surface of the band.

17. A deposition head for pressing a filament at a point of compaction on a surface of an article of manufacture, the deposition head comprising:

a body having a front mounting point and a rear mounting point arranged along a longitudinal axis;

a front wheel that is connected to the front mounting point;

a rear wheel that is connected to the rear mounting point;

a first actuator that is connected to the body at the front mounting point and the rear mounting point, and through which the front wheel is connected to the front mounting point;

a second actuator that is connected to the body at the rear mounting point, and through which the rear wheel is connected to the rear mounting point; and a band in the form of a loop, and having a circumference and a shape, arranged such that the front of the loop is in contact with the front wheel at a first point of contact, the back of the loop is in contact with the rear wheel at a second point of contact, and the bottom of the loop faces toward the surface of the article;

wherein at least one of the front wheel and the rear wheel is configured to drive the band along the circumference at a drive velocity that correlates to a relative velocity of the deposition head and the surface of the article;

wherein the first actuator is configured to change the shape of the band through the front wheel by imparting a first mechanical motion to the first point of contact of the band, in relation to the body; and wherein the second actuator is configured to change the shape of the band through the rear wheel by imparting a second mechanical motion to the second point of contact of the band, in relation to the body.

18. The deposition head of claim 17, wherein at least one of the first and second actuator is configured to change the shape of the band by imparting a rotational motion about a vertical axis at one or both of the first and second points of contact of the band.

19. The deposition head of claim 17, wherein at least one of the first and second actuator is configured to change the shape of the band by imparting a linear longitudinal motion at one or both of the first and second points of contact of the band.

20. The deposition head of claim 17, wherein at least one of the first and second actuator is configured to change the shape of the band by imparting a linear lateral motion at one or both of the first and second points of contact of the band.

* * * * *